United States Patent [19]

Oberholtzer et al.

[11] Patent Number: 5,465,399

[45] Date of Patent: Nov. 7, 1995

[54] APPARATUS AND METHOD FOR CONTROLLING TRANSMITTED POWER IN A RADIO NETWORK

[75] Inventors: John C. Oberholtzer; John H. Nitardy, both of Seattle, Wash.

[73] Assignee: The Boeing Company, Seattle, Wash.

[21] Appl. No.: 307,473

[22] Filed: Sep. 16, 1994

Related U.S. Application Data

[63] Continuation of Ser. No. 932,303, Aug. 19, 1992, abandoned.

[51] Int. Cl.$^6$ ...................................................... H04B 7/00
[52] U.S. Cl. ........................... 455/69; 455/54.2; 455/67.1; 455/88
[58] Field of Search ..................... 455/54.2, 69, 9, 455/10, 49.1, 52.1, 51.1, 34.1, 186.1, 127, 67.1, 115, 82, 68, 50.1, 63, 70, 88, 226.2, 226.3, 58.1, 54.1

[56] References Cited

U.S. PATENT DOCUMENTS

| | | | |
|---|---|---|---|
| 3,732,496 | 5/1973 | Boyer | 325/62 |
| 3,925,782 | 12/1975 | Anderl et al. | 455/69 |
| 4,228,538 | 10/1980 | Scharla-Nielsen et al. | 455/9 |
| 4,261,054 | 4/1981 | Scharla-Nielsen | 455/12 |
| 4,495,648 | 1/1985 | Giger | 455/73 |
| 4,580,262 | 4/1986 | Naylor et al. | 371/5 |
| 4,639,914 | 1/1987 | Winters | 370/110.1 |
| 4,653,114 | 3/1987 | Berman | 455/69 |
| 4,777,653 | 10/1988 | Bonnerot et al. | 455/52.1 |
| 4,811,421 | 3/1989 | Havel et al. | 455/69 |
| 4,825,193 | 4/1989 | Siwiak et al. | 340/311.1 |
| 4,991,184 | 2/1991 | Hashimoto | 375/8 |
| 5,001,776 | 3/1991 | Clark | 455/226.2 |
| 5,093,927 | 3/1992 | Shanley | 455/34.1 |
| 5,345,596 | 9/1994 | Buchenhorner et al. | 455/54.2 |

FOREIGN PATENT DOCUMENTS 0133316  11/1978  Japan ..................................... 455/58.1

*Primary Examiner*—Reinhard J. Eisenzopf
*Assistant Examiner*—Nguyen Vo
*Attorney, Agent, or Firm*—Christensen, O'Connor, Johnson & Kindness

[57] ABSTRACT

An adaptive power control used on a radio network and a method for adaptively controlling the transmit power level of member stations on the network. An exemplary network (12) includes a plurality of member stations (10a through 10f) between which radio signal propagation conditions are subject to change. Each member station includes a transceiver (21) having a transmitter (26) and a receiver (28) section. The transmit power level of the transmitter is controlled by a variable gain circuit (48) in response to a variable gain signal produced by a control (34). A member station uses a transmit power level determined by reference to a database in which signal-to-noise ratio (SNR) data defining the quality of each communication link and the transmit power levels last used for communication between each pair of member stations of the network are stored. If a response to a transmission in an initial frame is not received in the next frame, a controlling member station (server) incrementally increases its transmit power level by $P_D$ in successive frames, until either a response is received or the member station has failed to respond to a transmission at a maximum transmit power level, $P_{max}$. If the response indicates that the signal is received with an SNR in excess of a predetermined margin, the server reduces its transmit power level to ensure that the minimum transmit power is used.

36 Claims, 10 Drawing Sheets

APPARATUS AND METHOD FOR CONTROLLING TRANSMITTED POWER IN A RADIO NETWORK

This application is a continuation application based on prior application Ser. No. 07/932,303, filed on Aug. 19, 1992, now abandoned.

FIELD OF THE INVENTION

The present invention pertains to apparatus and a method for controlling the power of a transmitted radio signal, and in particular, for controlling the power of radio signals transmitted by each member station of a network, so as to ensure reliable communications between the various member stations.

BACKGROUND OF THE INVENTION

Radio transmitters usually have a fixed transmit power level, although some can be manually adjusted to reduce the power level of a transmitted signal below the maximum rated output power of the unit. For long distance point-to-point communications, transmissions are normally made at the full rated power of the transmitter, thereby insuring the maximum likelihood of success in communicating with the intended recipient. However, for short range communications, it is often desirable to moderate the transmission power level, for example, to avoid overloading the front end of a nearby receiver, or to minimize the area over which the radio signals can be received and thus, the possibility of causing interference with other more distant transmitters that are using the same frequency.

In a network of stations communicating with each other, the reception between any two member stations can vary from time to time, particularly if the stations are mounted on mobile platforms so that the distance and propagation path between the stations continually change. For the operator of a member station in such a network, it can be relatively difficult to optimally manually adjust the transmitter power level to maintain communications with all other member stations. The transmit power level used by a given station should be just sufficient to establish and maintain effective communications with the station in the network that has the poorest reception quality. Typically, an operator attempting to communicate with selected members of a network will manually increase the transmit power level of his transmitter until each station with which he is attempting to communicate reports back that they have heard his transmission. This process can require several minutes and likely must be repeated after only a few minutes have elapsed if signal propagation conditions between member stations are changing rapidly. Clearly, it would be beneficial to have an automated system that adjusts the transmit power level without human intervention.

U.S. Pat. No. 3,732,496 discloses a radio transmitter and receiver that include means for automatically adjusting the transmission power level. In this patent, an attenuator providing a stepped variable attenuation level is controlled by the frequency of a signal received from another transmitter/receiver in the network. Each station in the network includes means for transmitting a signal at a specific frequency selected from a predetermined set of such frequencies; the frequency selected is indicative of the level at which a transmission from another station in the network is received. A selector device at each station includes a set of threshold circuits that determine the relative signal strength of a received signal and select appropriate combinations of frequencies for the signal transmitted back to the original transmitter. This signal indicates the reduction (in dB) that the original transmitter should apply to its transmit power to achieve a desired power level.

A slightly different solution to this problem is disclosed in U.S. Pat. No. 3,925,782. In this reference, transmissions by one of the member stations in a simplex network are periodically interrupted to transmit an interrogating code to the other stations asking for a power correction request from each. Power correction requests are sequentially received from the other stations during allotted time slots. The sending station then adjusts its transmit power level consistent with the lowest power reduction request that was received from the other stations.

A disadvantage of the systems disclosed in both of the above-referenced patents is that a transmitter of a station that wants to communicate with another station initially transmits a signal at a relatively high power to establish communications and then reduces its transmit power level in response to a signal from another station indicating an appropriate transmit power level reduction. As a result, an excessive transmit power level will often initially be used to establish communications between the stations. In certain instances, it may be very important to use the minimum power level required for effective communications at all times. Use of an excessive transmit power level to initiate communications between stations in a network clearly violates this requirement.

The present invention addresses the problems described above in a different manner than is disclosed in the prior art. Advantages of the present invention will become more readily appreciated as the same becomes better understood by reference to the detailed description provided below, when taken in conjunction with the accompanying drawings.

SUMMARY OF THE INVENTION

In accordance with the present invention, an adaptive power level radio network comprises a plurality of member stations, and any member station that initiates a communication with at least one other member station comprises a controlling station on the network. Each member station includes a transmitter having a variable transmit power level capability, so that when the member station is the controlling station, its transmitter transmits a radio signal at a predefined power level initially set to a level that is less than a predefined maximum power level of the transmitter. In addition, each member station includes a receiver on which to receive radio signals from other member stations of the network, and control means that are connected to both the receiver and the transmitter. The control means control the transmit power level of the transmitter and adjust the transmit power level when the member station is the controlling station as a function of a respondent signal received by the controlling station from the transmitter of another member station with which the controlling station is communicating (or as a function of failing to receive the respondent signal). The respondent signal indicates that the other member station has received a transmission from the controlling station. If the controlling station fails to receive the respondent signal from the other member station, the control means incrementally increase the transmit power level of the transmitter in the controlling station.

Each member station further includes means for determining a reception quality for radio signals by the receiver of that member station, the control means in each member station reporting the reception quality of the radio signal initially received from the controlling station in the respondent signal. If the lowest reception quality indicated by the respondent signals exceeds a predefined value, the control means reduce the transmit power level of the transmitter in the controlling station. Preferably, the control means comprise a processing unit and associated memory means for storing instructions that determine how the processing unit controls the transmit power level of the transmitter in the controlling station, in response to the respondent signal.

The memory means also store data that include the reception quality of signals transmitted by other member stations and the transmit power level used by transmitters of other member stations in the network. These data are compiled from the respondent signals from the other member stations. The control means for a member station use the data to determine the predefined transmit power level for the transmitter of that member station as a function of the poorest reception quality for all of the member stations stored in the data, thereby insuring effective communication between the transmitter in the controlling station and the member station that reported the poorest reception quality in its respondent signal.

In controlling the transmitter with which it is connected, the control means operate in a plurality of modes, including: (a) a passive monitor mode, entered when the network is being initialized, before a station becomes one of the member stations of the network and before the data are stored in the memory means; (b) an active mode, wherein the station is one of the member stations of the network, its control means have identified other member stations of the network, and at least some data have been stored in the memory means; and, (c) a controlling mode, wherein the control means are in communication with at least one other member station of the network or attempting to establish communication as the controlling station, and data for substantially all of the other member stations are stored in the memory means of that member station. In the preferred form of the invention, the means for determining the quality of reception comprise a signal-to-noise power ratio monitor.

Each member station identifies itself with an identification code in the respondent signal that it transmits. The control means of the member station encodes the identification code, the reception quality, and a transmit power level in the respondent signal transmitted to the controlling station.

If the control means of one of the member stations transmits a break-in signal to interrupt communication between other member stations in the network, the control means of the controlling station terminate the communication in process upon receipt of the break-in signal, and the member station transmitting the break-in signal becomes the controlling station.

The transmitter and the receiver of at least one of the member stations are alternatively selectively connected by the control means to an antenna, to respectively transmit and receive radio signals through the antenna. For at least one of the member stations (if not all), the transmitter and receiver preferably comprise a transceiver.

Signals transmitted from one member station of the network to another member station comprise frames of a predefined duration. The control means determine the contents of each frame, and each frame comprises an interval for a control block and a communication block.

A further aspect of the present invention is a method for adaptively controlling a transmit power level of a radio signal transmitted by a transmitter in a member station of a network. The steps comprising the method are generally consistent with the functions defined for the elements of the network described above.

DETAILED DESCRIPTION OF THE PREFERRED EMBODIMENT

Radio Network Overview

Figure 1:
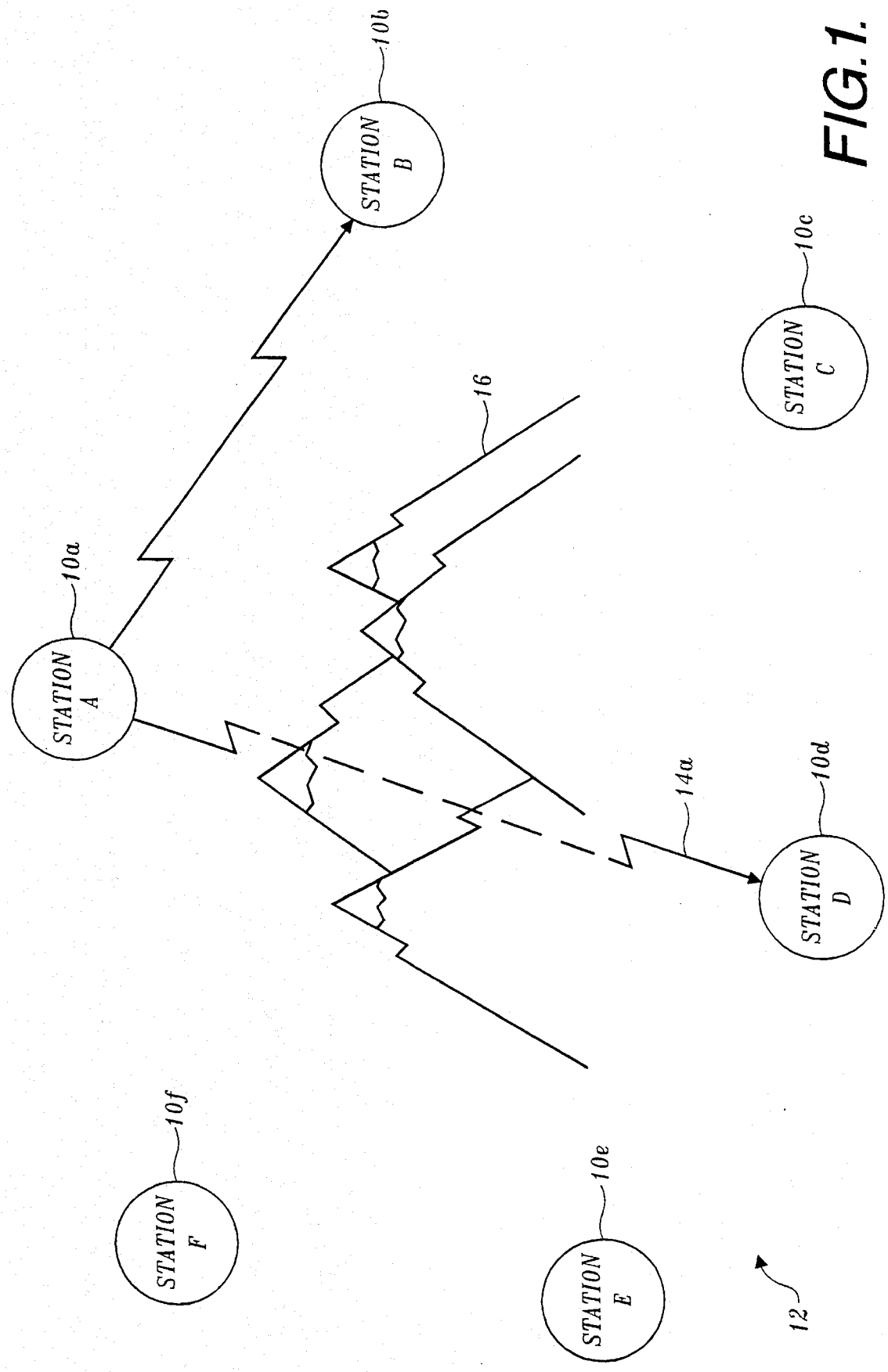
FIG. 1 is a schematic diagram of a radio network comprising a plurality of physically separated member stations.

A radio network is schematically represented in FIG. 1, generally at reference numeral 12. Radio network 12 is shown in an exemplary fashion as comprising six member stations 10a–10f, correspondingly identified as stations A–F. One or more of member stations 10 may comprise mobile platforms moving about with respect to the other member stations in network 12. For example, each member station 10 may be disposed on an aircraft (not shown) generally flying in the same geographic region.

Due to different radio signal propagation conditions that exist between the various member stations of radio network 12 and possible jamming of the signals transmitted, a different minimum transmitter power level may be required to provide acceptable radio communication between any two members. For example, member station 10a may be able to communicate effectively with member station 10b using a transmitter power level of only one watt. However, because a radio signal 14a from station 10a must pass through mountainous terrain 16 to reach member station 10d, a transmit power level of 2.5 watts may be required for effective communications between stations 10a and 10d to compensate for signal loss. In addition, member station 10d may be located at a substantially greater distance from member station 10a than is member station 10b. If member station 10a is trying to reach both member stations 10b and 10d with the same transmission, the higher transmit power level is required. In the preferred form of the invention, all radio transmissions by any member stations 10 are intended to be made at a transmit power level sufficient to reach and communicate effectively with all of the member stations (if possible), even though the actual message may be intended for only one of the member stations. By using the minimum required power to reach all member stations, any member station transmitting a message to one or more other member stations avoids using an excessive transmitter power level. The method and system used to establish a minimum transmit power level for effective communication with each member station in network 12, automatically and without operator intervention, thus represents a principal object of the present invention.

In the preferred form of the invention, communications between member stations 10 in network 12 are maintained in the form of digital links between each pair of member stations, each digital link for a member station being a "link to" and a "link from" another member station. These communications can be in the form of digitized voice or digital data transfer. The philosophy of the method and system is to provide robust communications between the member stations by maximizing the use of available information resources, minimizing the probability of interception by other stations (by minimizing transmit power level, and expediting the initiation of communications). The network is automatically organized and maintained, in a manner transparent to the operator. Each member station adjusts its transmit power level in communicating with other member stations so as to ensure viable communications by maintaining a prescribed power margin above a predefined threshold reported by the member station with the lowest signal-to-noise ratio (SNR). Any station 10 can join, leave, initiate communications, or interrupt an on-going communication on the network. In addition, a station (not shown) that is not a member of the network can communicate with selected member stations of network 12, although no member station will adjust its transmit power level in consideration of this non-member station.

There are three aspects or functions to the operation of network 12 that are provided under the present invention: (a) signaling, (b) networking, and, (c) adaptive power and control. The signaling function is responsible for determining which link and which transmit power level a member station will use for establishing communications with other member stations. As used hereafter in this disclosure of the invention, the member station 10 that initiates a communication by signaling is referred to as a "server," because it has a message for at least one other member station. All other member stations are referred to as "clients." Any member station 10 can be a client or server, depending upon the role that it plays in a given communication session.

The facilities for network management provided by the present invention enables all member stations to cooperate in the operation of the network with a minimum of additional radio traffic. The network management is automatic and transparent to the radio operator, with each member station maintaining communication links with other member stations, and providing means that allow a station to readily join, interrupt, or leave the network. Under adaptive power and control, the transmit power level of each member station is managed automatically such that minimum transmit power is used to maintain communications between all member stations. The adaptive control increases or decreases transmit power level to take into consideration the effect of changes in data rate, increases transmit power level as determined by the response of member stations polled, and decreases the transmit power level after all member stations have responded, based on a determination that an acceptable SNR margin can be maintained with the reduction.

Transceiver Description

Figure 2A:
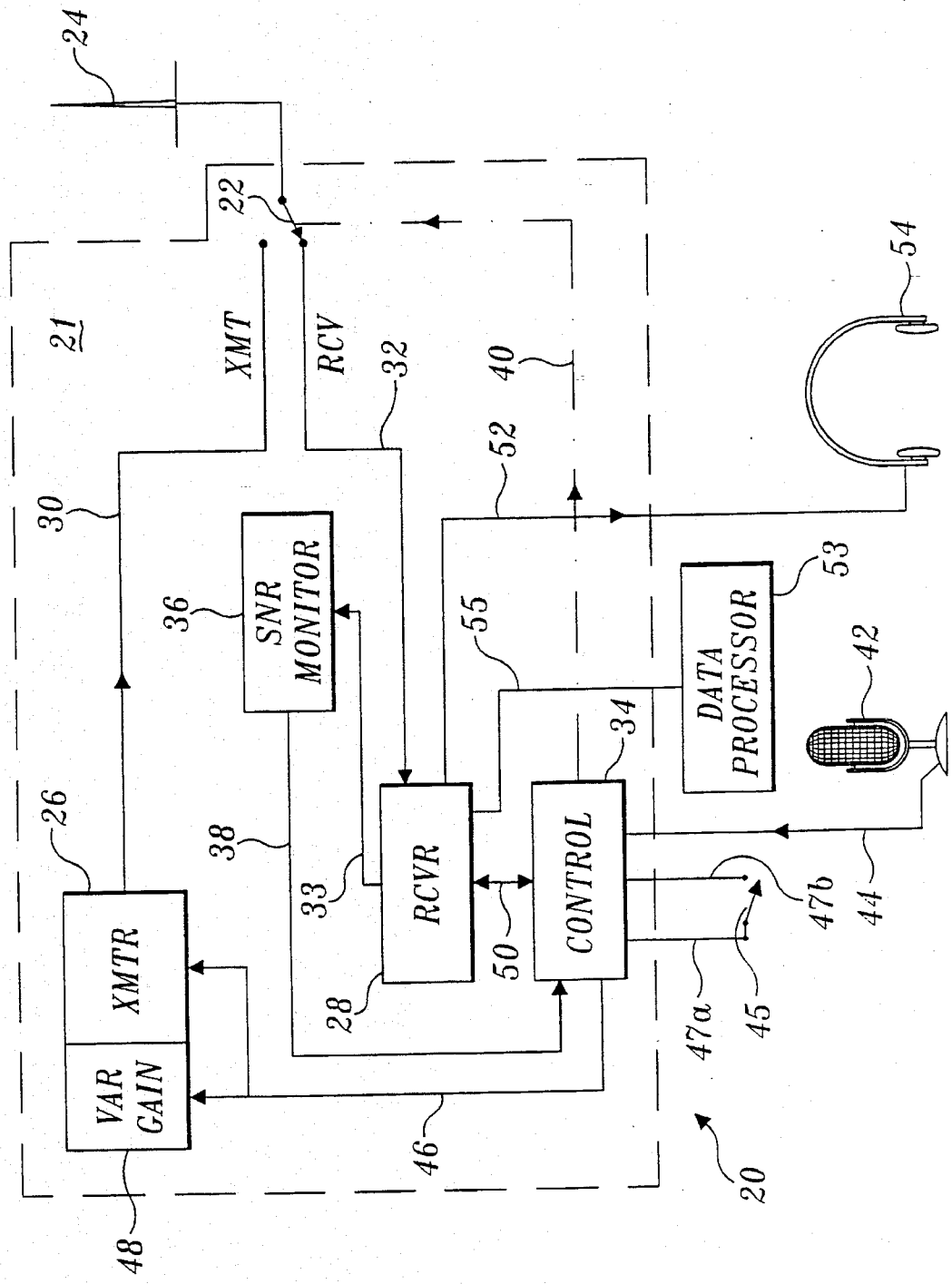
FIG. 2A is a schematic block diagram of the functional components of one of the member stations in the network of FIG. 1, the present invention being used to control the transmit power of the member station.
Figure 2B:
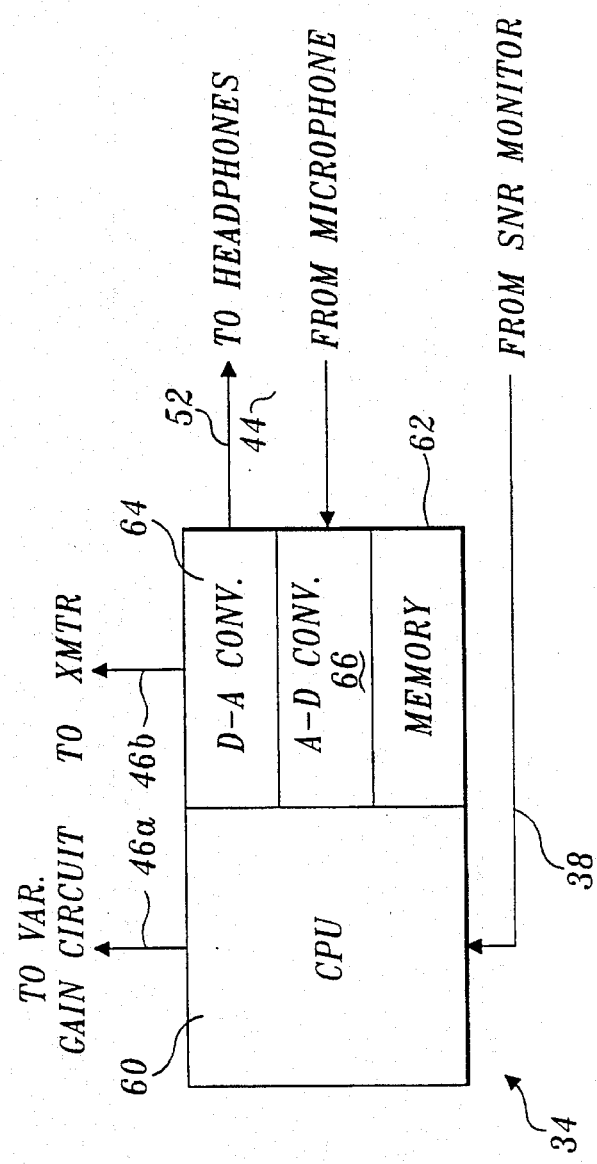
FIG. 2B is a schematic diagram of the control used to modulate the transmit power of a member station in the preferred embodiment of the present invention.

Turning now to the schematic block diagrams of FIGS. 2A and 2B, apparatus 20 are shown for automatically controlling the transmit power level of each member station 10 comprising radio network 12. In this preferred embodiment of the invention, an automatically controlled (electronic) switch 22 is used to selectively connect a radio antenna 24 to either a transmitter 26 through a line 30, or a receiver 28 through a line 32. The position of switch 22 is determined by a signal conveyed from a control 34 over a line 40. Normally, switch 22 is in the receive position (as shown in the figure) connecting radio antenna 24 to receiver 28. Radio antenna 24 may comprise a simple dipole, stub antenna, or other antenna configuration appropriate for the platform on which the antenna is disposed.

Although shown separately in FIG. 2A, transmitter 26 and receiver 28 preferably comprise the transmitter and receiver sections of a transceiver 21. Since separate transmitter and receiver components could also be used by each member station 10, the terms "transmitter" and "receiver" are used interchangeably to refer to both separate components and the transmit and receive sections of a transceiver, both in this disclosure and in the claims.

Radio transmissions received by radio antenna 24 are demodulated by receiver 28, producing, for example, an analog voice signal, which is conveyed over lines 52 to earphones 54. Alternatively, the transmissions received by receiver 28 may comprise data that are output from receiver 28 to a data processor 53, comprising, for example, a digital display. In this preferred embodiment, all messages that are transmitted, including voice and data, are processed in a digital format representing frames of 0.1 second duration, but are converted to an analog signal that is input to transmitter 26 to modulate the transmitted radio signal. Even though the radio signal is analog modulated, it represents a digital link between member stations 10. The message is converted from analog format to digital format after its reception and demodulation by receiver 28, processed by control 34, and converted to its analog representation (if it is a voice message).

An operator desiring to transmit a voice message to another member station 10 within the network closes a communication switch 45. A microphone 42 picks up the operator's voice, producing an analog signal that is input over a line 44 to control 34. Closure of switch 45 causes control 34 to move switch 22 to the transmit position after reception of a current frame is complete, thereby connecting radio antenna 24 to transmitter 26. An analog voice signal input to control 34 is digitized and converted into a suitable frame-by-frame message format for transmission, by control 34. The digitized voice signal is then converted to analog representation, and the analog signal is conveyed over lines 46 to transmitter 26. Digital data are transmitted when a digital source (not shown) provides the data to control 34, along with an external signal requesting that the data be transmitted. The initiation of either voice or data transmission represents the signaling function discussed above.

Lines 46 also carry a variable gain signal produced by control 34 to a variable gain control 48 associated with transmitter 26. Variable gain control 48 is disposed just ahead of a power amplifier section (not separately shown) in transmitter 26 and sets the transmit power level of the transmitter in response to the variable gain signal produced by control 34. The transmit power produced by transmitter 26 ranges between a predefined minimum and a predefined maximum level, which are selected for a specific network to accommodate expected signal propagation conditions and other concerns.

Generally, the transmit power level output from transmitter 26 that is used to initially establish communications with other stations when forming network 12 is the default transmit power level, $P_{default}$. If no stations respond to transmissions at this transmit power level when the network is being formed, then the transmit power level of the station forming the network is incrementally increased in steps, $P_D$, until receiver 28 receives a signal from any of the other stations that will comprise the network indicating that the communication link with that member station has been established, or until the maximum transmit power, $P_{max}$, is reached and no station replied, whichever occurs first. A similar paradigm is implemented each time that messages are subsequently transmitted, but the station that is transmitting a message initially uses a transmit power level that is determined based on parameters developed during previous communications and increases its transmit power as necessary to establish a communication link with a first member station (one selected because communications with it are most difficult).

When receiving a transmitted signal from another member station, the SNR of the received signal is measured on an SNR ratio monitor 36, which has its input connected to receiver 28 by a line 33. SNR power ratio monitor 36 produces a digital SNR indicative signal that is conveyed over a line 38 to control 34. Control 34 encodes the SNR of the signal received from a member station of the network and its own transmit power level for inclusion in its response when polled by a member station that is initiating a communication to transmit a message. Details of the steps used to establish the network and to determine the appropriate transmit power level used by each member station in the network in communicating with other member stations 10 are described below.

Control 34 in each member-station develops a database containing transmit power levels and received SNRs for other member stations 10 comprising network 12. The data contained within this database are updated by control 34 in each member station when any member station acting as the server communicates with other member stations in the network and reflect changes in radio signal propagation conditions, electromagnetic interference or noise, and distance between member stations 10. Adaptive transmit power control is implemented by control 34 as a software algorithm (along with other network management responsibilities). Accordingly, as shown in FIG. 2B, control 34 comprises a central processing unit (CPU) 60 that carries out a series of predefined program steps stored in a memory 62. Memory 62 comprises both a random access memory (RAM) (not separately shown), which is used for storing temporary data, and a read only memory (ROM) (not separately shown), which is used for storing the steps for carrying out the adaptive transmit power control algorithm. In addition, control 34 includes a digital-to-analog converter (DAC) 64, which converts outgoing messages from their digital representation to an analog signal that is input to transmitter 26 and converts the digital representation of messages received to an analog signal that is output over lines 52 to headphones 54 (shown in FIG. 2A). An analog-to-digital (A-D) converter 66 is also included within control 34 for digitizing the analog voice signal from microphone 42 (in FIG. 2A).

Network Context Diagram

Figure 4:
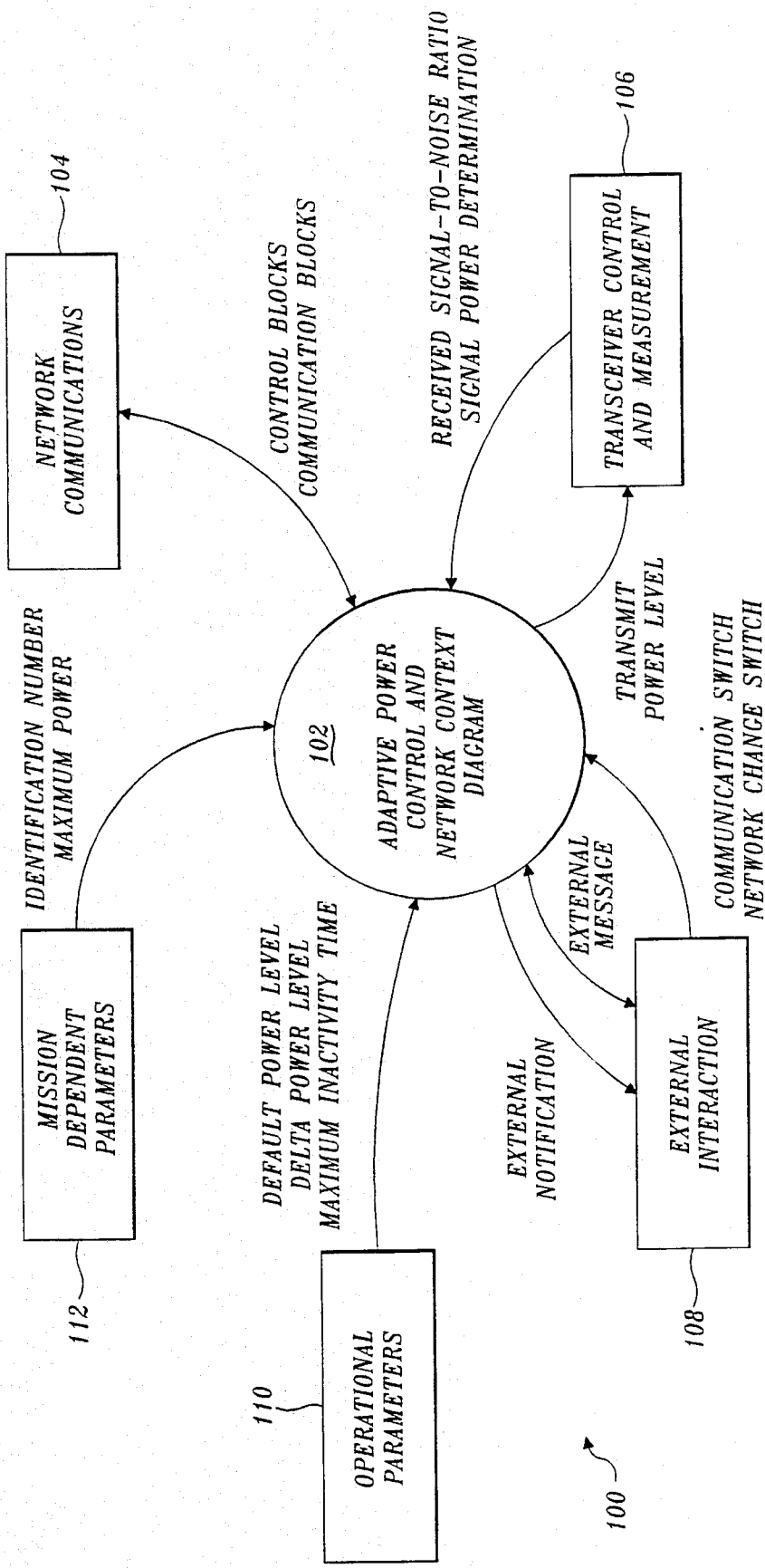
FIG. 4 is a Context diagram of the adaptive power control and network of the present invention.

In FIG. 4, an adaptive power control and networking Context diagram 100 illustrates the externally supplied information that is processed by CPU 60 in transceiver 21 to implement adaptive power control and networking functions, and the information that the CPU generates in carrying out these functions. A core 102 of Context diagram 100 represents the tasks carded out to perform the adaptive power control functions and other networking functions. One of the primary objects of adaptive power control is to provide effective network communications between member stations at the minimum required transmit power levels, as indicated by the flow to a block 104, which represent communications messages flowing between a specific member station and all other member stations of the network. These communication messages comprise control blocks and communication blocks, as explained below.

A block 106 provides for control of the transmit power level used by transceiver 21 and determines the SNK of messages received from other member stations 10. The caption in a block 108 refers to external interactions with core 102, which include monitoring use by the operator of communication switch 45 for initiating voice communications with other member stations 10, notification of a change in the network channel in use, and exchange of external messages. A block 110 represents operational parameters used in operating the adaptive power control network, such as the default power level, $P_{default}$, the incremental increase in transmit power level, $P_D$, and a maximum time, $T_{inactive}$, the use of which is described below.

In a block 112, mission dependent parameters are provided to core 102 and include the maximum transmit power level, $P_{max}$, and a unique identification (ID) number that is assigned to each member station 10. If a transceiver 21 initiates communication when it is not part of a network, its transmit power level is determined by the operational parameters defined in block 110, or the mission dependent parameters from block 112, or by external interaction in block 108. If a non-member initiates communication before the network is formed, the transceiver sends a control block, followed by a message in a communication block (as described in detail below), but it does not poll the other stations and does not expect to receive a responding control block from another station. Likewise, even though a non-network transceiver receives messages transmitted between member stations in network 12, it will not be polled and member stations will not adjust their transmit power level for the non-network transceiver.

State Diagram and Forming the Network

Figure 5:
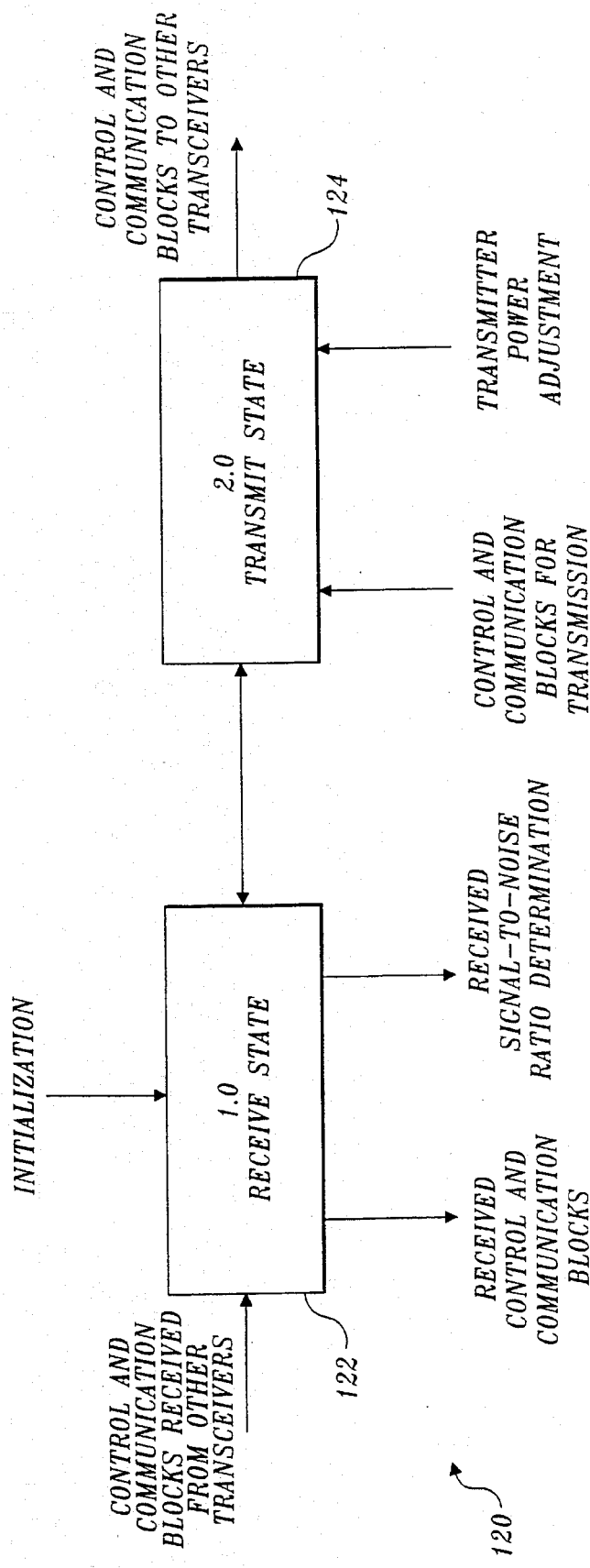
FIG. 5 is a state diagram of the adaptive transmit power control for a transceiver of a member station.

FIG. 5 is a state diagram 120 for the components of transceiver 21. The transceiver operates either in a receive state 122 or a transmit state 124. When transceiver 21 is first energized, it defaults to receive state 122 and undergoes initialization, i.e., is set to the desired channel on which network 12 is operating and is provided with the other operating parameters. Transceiver 21 is in receive state 122 at all times when it is not transmitting, enabling it to receive messages from other transceivers 21. The received control blocks and communication blocks are input to control 34 and interpreted, enabling it to respond accordingly. In addition, while operating in receive state 122, the SNR of all transmissions received are measured by SNR power ratio monitor 36, enabling the SNR of a received polling transmission to be reported back in a respondent message to a member station requesting a response.

A toggle between operating states 122 and 124 occurs when a message is to be transmitted (but only after any transmission being received is complete), and transceiver 21 enters transmit state 124 to allow the operator to transmit a voice message or data to the other member stations. While operating in transmit state 124, control 34 determines the transmit power level used with the variable gain signal it produces, as described above. Control 34 also generates the digital control and communication blocks for transmission to other members stations in the network after conversion of the analog signal to a corresponding digital signal by A-D converter 66 (FIG. 2B). The digital representation of the control and communication blocks comprising such messages are transmitted during successive 0.1 second time frames by transmitter 26. At the end of a message, control 34 toggles the transceiver to receive state 122. A toggle between receive and transmit operating states also occurs automatically if control 34 is responding to a polled request from the member station. Such a response typically occurs during a single 0.1 second frame and does not require operator involvement.

Figure 6:
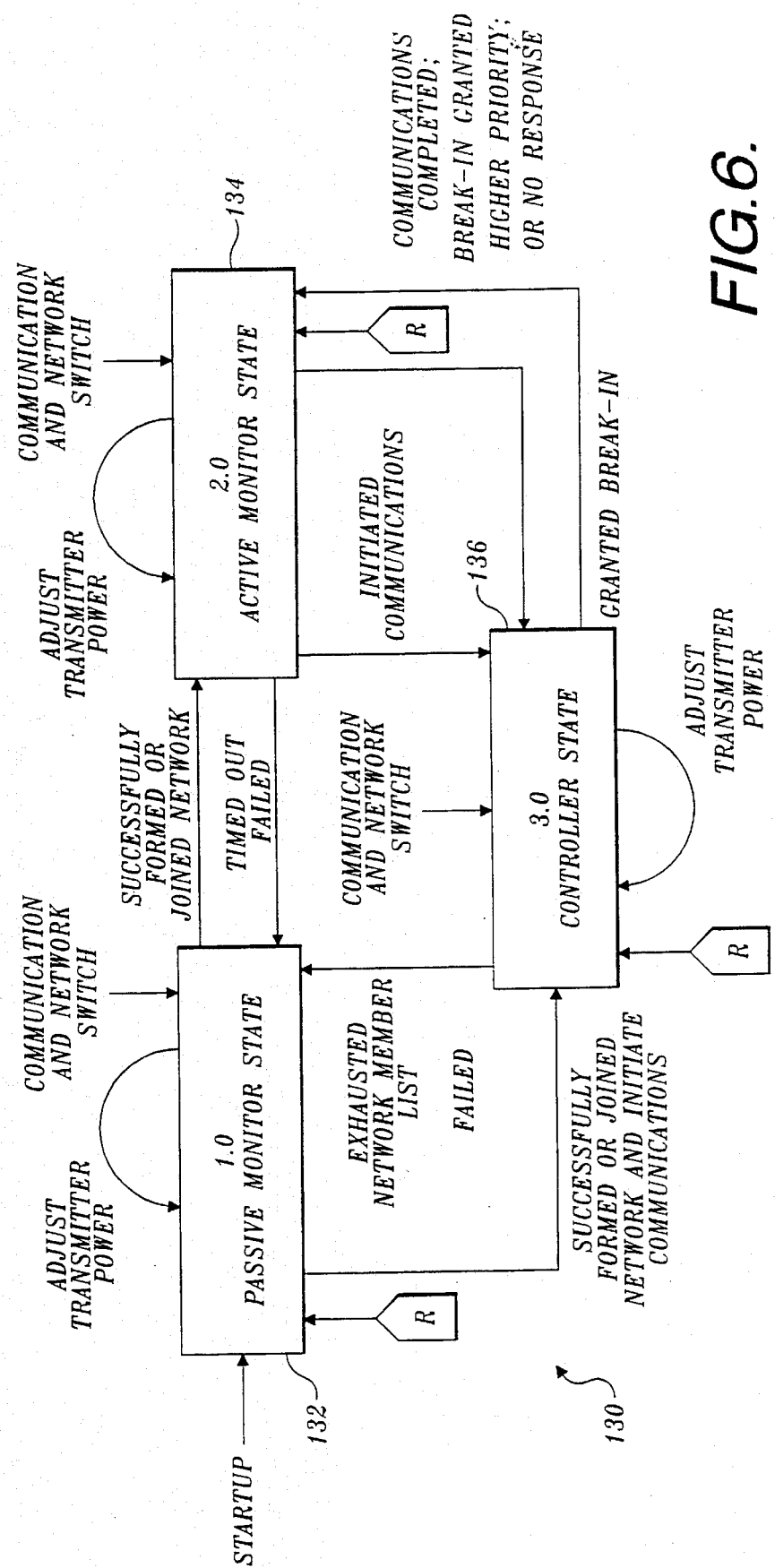
FIG. 6 is a state diagram of the adaptive transmit power control and network used in the preferred embodiment.

In FIG. 6, a state diagram 130 is shown for the adaptive power control and network. The blocks identified with an "R" represent either: received communication blocks, received control blocks, control blocks reporting an SNR, or blocks indicating transmit power level. As illustrated in this figure, transceiver 21 exists in one of three possible states with regard to its status (i.e., the status of member station 10) on network 12. The first state is a passive monitor state 132, which transceiver 21 enters upon startup or formation of the network when the member station is not a part of the network or has little or no knowledge of the network or of its communication links.

The network is formed as control 34 of any station wanting to join is requested to initiate the form network procedure. The transceiver in the initiating station sends a control block comprising a form network request, transmitting at the default power level, $P_{default}$, and then listens for a response. If no response is received within a prescribed time, the form network control block is again transmitted at an increased power level. This step is repeated until $P_{max}$ is reached or a response is received, whichever occurs first. However, if a control block is received in response from one or more transceivers 21 of other stations who wish to join the network, after a prescribed time, control 34 in the station initiating the form network procedure determines a transmit power level that will provide a predetermined SNR margin for all stations that responded to the form network request to receive data defining the quality of the various links between member stations of the network thus formed. This initiating station then transmits a control block informing the member stations that communications blocks will be transmitted that contain the data describing the quality of the communication links between the member stations. The member stations receive the current data and store it in memory 62 within their respective controls 34.

During subsequent communications, control 34 in each member station automatically adjusts the transmit power level that is used as a function of the SNR reported by other member stations 10. While in passive monitor state 132, control 34 decodes control and communication blocks (messages) from the transceivers of other stations. The control blocks are processed to determine the transmit power level used by each member station, the SNRs of received transmissions reported by each member station, and to determine other network management actions (not related to adaptive transmit power control). During operation in passive monitor state 132, control 34 digitally encodes control blocks and communication blocks for transmission to other member stations, performs external requests (e.g., responding to the closure of communication switch 45, or switching the network to a different channel), initiates transmissions required to join the network, and initiates actions required to form the network—all independent of operator action.

The second state of transceiver 21 is an active monitor state 134. Transceiver 21 typically enters active monitor state 134 after substantially all of the other member stations have joined the network and after control 34 has complete knowledge of communication quality for at least some of the communication links and incomplete knowledge of communication quality for the remaining links between the member stations of network 12.

Each network station has its assigned unique ID number that it received as part of the mission dependent parameters in block 112, and while operating in the active monitor state, all member stations of network 12 are aware of their own and other member station ID numbers. This information is stored in a database by control 34, within memory 62. During operation in active monitor state 134, control 34 automatically carries out many of the same functions that it did in passive monitor state 132, including: calculating any required adjustment to the transmit power level, decoding communication and control blocks received from other member stations, processing decoded communication and control blocks, and performing external requests (e.g., responding to closure of communication switch 45 and changes in the network channel). In addition, control 34 responds to polling commands, i.e., requests for response to transmissions initiated by other member stations in the network. It also can initiate a break-in request, enabling it to interrupt ongoing communications between other member stations of the network.

The third state in which transceiver 21 operates is a controller state 136, which generally has all of the characteristics of active monitor state 134. In addition, all links and their communication quality are completely known in the controller state. During operation in controller state 136, control 34 in transceiver 21 carries out all of the functions of active monitor state 134. The capabilities of transceiver 21 operating in the controller state are identical with most of those of a transceiver operating in the active monitor state; however, while in the controller state, control 34 sequentially polls member stations 10, requesting a response from each that includes the SNR with which its transmission is received and the transmit power level data used by the member station, and generally coordinates networking activities for all member stations on the network. For example, it determines and informs member stations that a break-in control block has been received, to indicate that one of the member stations has initiated a network break-in request, and terminates communications with the other member stations, thereby enabling the member station that initiated the break-in request to enter the controller state in order to communicate its message. The relationship between the various causes of communication requests to which control 34 responds and the three operational states is described below in Table 1.

messages following are responses to another member station's request, including: a join network request response, a polled response, and a beginning of message response. The

TABLE 1

| Comm. Request | Passive Monitor State | Active Monitor State | Controller State |
|---|---|---|---|
| Initiate Communications | If no active communications.- | No active commun. Switch to Cont. State | N/A |
| | Initiate communications If active communications, | Initiate communications If active communications, | |
| | wait until end of message received then initiate communications after predetermined delay. | wait until end of message received; then initiate signal-ing & switch to Cont. State | |
| Terminate Communications | Terminate communications | N/A | Terminate message Send Join Network Request, then terminate commun. after servicing any Join Network request received. |
| Join Network | No known network | N/A | N/A |
| | Wait for network to become active and make Request to Join at first opportunity; if successful, switch to Active Monitor State Known network | | |
| | If network active, join, else, send Join Network Request & switch to Active Monitor State if successful | | |
| Form Network | Issue Form Network | N/A | N/A |
| | If successful, switch to Active Monitor State | | |
| Break-In | N/A | Send Break-In Request Only appropriate if a transceiver is in Controller State | N/A |

Communication Frame Structure

Figure 3A:
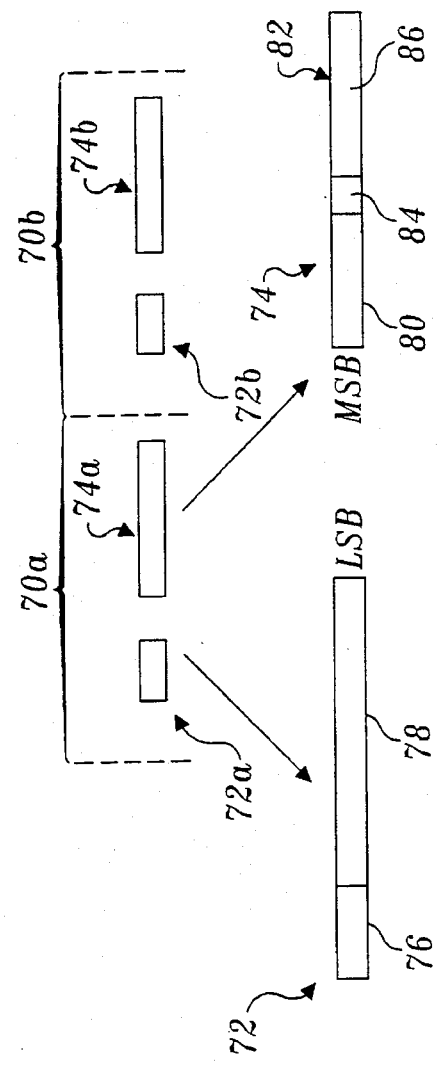
FIG. 3A graphically illustrates an exemplary message block transmitted by a member station in the network of FIG. 1.

Communications between member stations 10 occur during a series of time frames, each of predefined duration. In FIG. 3A, two communication frames 70a and 70b are schematically represented, illustrating the transmission format used in the preferred embodiment of the adaptive power control network system. Each communication frame 70 is approximately 0.1 second in duration and is time sliced into two parts, including control block 72a and communication block 74a in frame 70a, and control block 72b and communication block 74b in frame 70b; however, in some cases, only control blocks 72 or communication blocks 74 are used in a transmission frame. Each frame 70 can comprise any combination of control blocks 72 or communication blocks 74 from any transceiver. By way of example, control block 72a is shown in greater detail; it comprises an op code field 76, which specifies the behavior to be carded out by the intended recipient, and a data field 78, which provides material for the recipient to operate on. The general categories of op code fields 76 are: extended network information (ENI), polled response (PR), network control (NC), and network information response (NIR).

Control blocks including the NC op codes provide for transceiver control over the network, including: forming the network, joining the network, leaving the network, and beginning communications. If the PC op code is used, the ENI op codes are used in a control block to instruct member stations that the message in communication block 74 may contain network information, such as break-in or form network data. A control block including the NIR op code is issued in response to a form network control block.

Control block data field 78 comprises combinations of transceiver ID code, communication data rate, transmit power level, SNRs, and member station IDs for the client and server.

Communication block 74 comprises a message field 80 and a network message 82. Message field 80 generally includes the information being transmitted to the intended recipient, but can at times include networking information. Network message 82 provides control over the network by the server during communications and comprises an op code field 84 and a data field 86. The op code fields are divided into general types, including: extended network (EN), acknowledge (ACK), polling (POLL), and closure (CLSR). Data field 86 comprises combinations of transmit power level, control codes, SNRs, and client member station IDs.

Figure 3B:
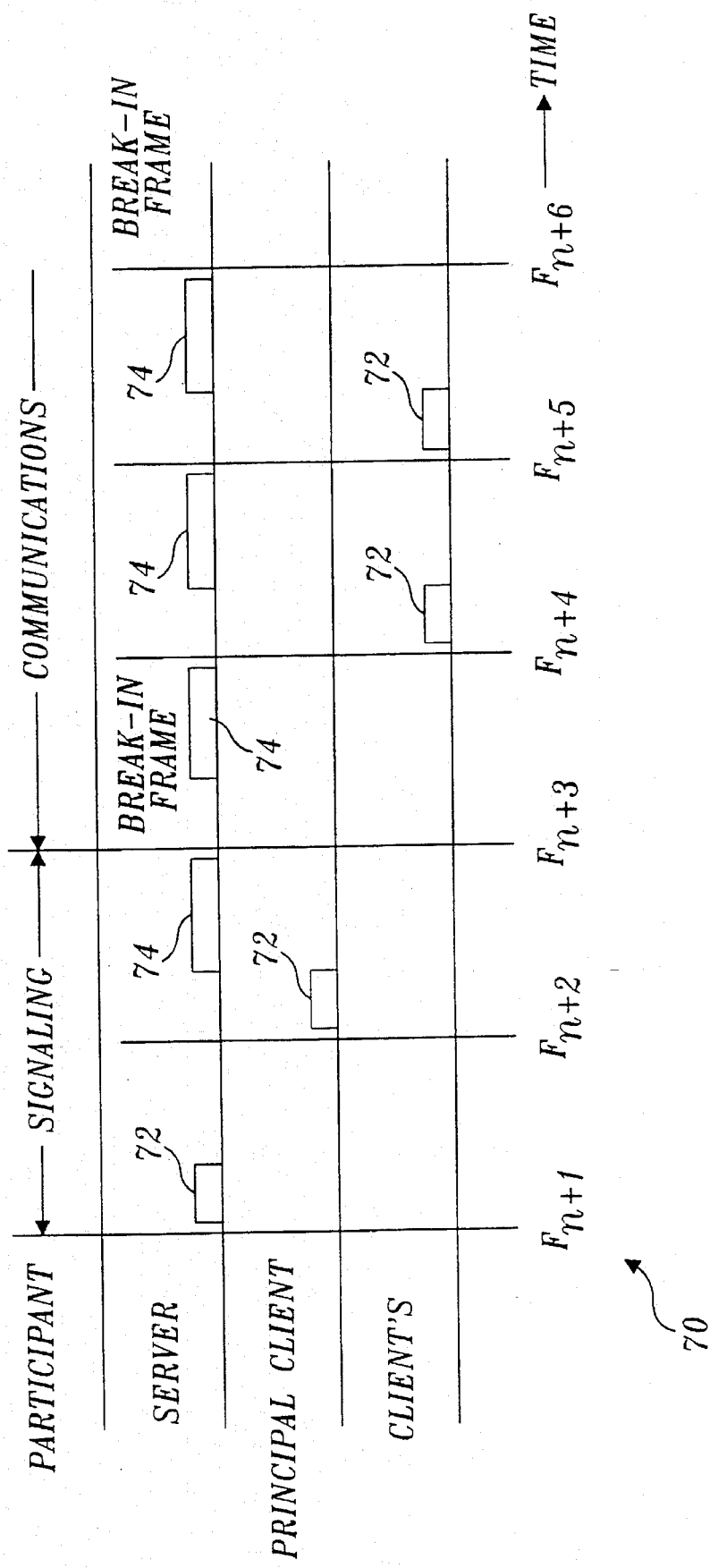
FIG. 3B is a graphic representation showing successive time frames for a network communication and the entities participating in that communication.

FIG. 3B illustrates how normal communications for network 12 are carded out over a sequence of frames 70 designated $F_n$ through $F_{n+6}$, indicating the separate transmission from member stations functioning as the server, principal client, and (other) clients. A member station initiating a communication designates itself as the server and begins "signaling" by transmitting a communications control block 72a' in frame $F_n$. The data field of this control block contains the communication data rate for the following communication blocks in subsequent frames, the server network ID number, the principal client network ID number, and the server's transmit power level. The member station first requested to provide a response, i.e., the first principal client, will be one that failed to respond to the last poll by any member station in the network, or the member station reporting the poorest SNR when last responding (information that is part of the data stored in memory 62), or one whose last message received by the signaling transceiver is greater than a predetermined margin. If the principal client receives this transmission, it responds in frame $F_{n+2}$ with a beginning of message response control block in op code field 84 and, in data field 86, the SNR with which the principal client received the server's transmission, the principal client's network ID, and the server's network ID, and the principal client's transmission power. Ideally, this data provided in the principal client's response is received by all member stations 10 in network 12, providing them with information regarding the principal client's current transmit power level and the reported SNR for the last server transmission received by the principal client. In addition, each member station records the SNR with which it received the response from the member station that transmitted it. These data are thus used to continually update the database stored by each member station 10, so that it includes the latest information concerning the transmit power level and quality of communication for communication links between each pair of member stations comprising network 12. If the server received the response from the principal client, signaling is completed and the message communications begin by the server in frame $F_{n+2}$. Otherwise, the server increases its transmit power level and repolls the principal client (or selects a different principal client for polling).

During communications, the server provides periodic break-in opportunities for any other client to interrupt the communication message (every third frame after the first), informs all of the member stations of its transmit power level, and polls each of the other member stations for their transmit power level and for the SNR with which the server's transmissions were received by the other clients. When the server receives the other clients' response control block, e.g., as shown in frames $F_{n+4}$ or $F_{n+5}$, the server sends the client's received SNR or informs the client that it did not receive the client's response control block in the network message (occurring during the same frame).

Instead of being used for polling one of the other client member stations, every third frame, e.g., frames $F_{n+3}$ or $F_{n+6}$, is made available by the server for transmission of a break-in request by any of the other member stations. Accordingly, control 34 of any other member station having a need to communicate with one or more other member stations 10 transmits a control block 72 requesting break-in, for example, in response to the operator pressing communication switch 45 on the transceiver. In response to its reception of a request for break-in control block, the server validates the control block and if successful, transmits a "break-in granted" network message, enabling the member station 10 requesting the break-in to initiate signaling, and terminates the communication that was in progress. The member station granted break-in privileges then begins operating in the controller state as the new server and signals the member station reporting the lowest SNR or any member station that had failed to respond during the last communication round (based on data stored within the database of the new server). Since the adaptive power control and network management functions are handled automatically in software by controls 34, communications between member stations 10 comprising network 12 proceeds seamlessly, without apparent delay. Furthermore, only the minimum transmit power level required to communicate effectively with all other member stations in the network is used.

In the event that a member station that previously had the lowest reported SNR responds to the server, indicating that the last transmission was received with an SNR that is greater than a predefined margin, the server reduces its transmit power level to that power level now required for effective communications. For example, if the predefined margin SNR is 6 dB, and each incremental change in transmit power level is less than 1 dB, a response from a member station of the network previously reporting the lowest SNR indicating that the current SNR of the signal received from the server is now 10 dB causes the server to reduce its transmit power level by 4 dB to maintain the margin of 6 dB.

Since the propagation paths for radio transmissions and the radio frequency interference (RFI) or electromagnetic interference (EMI) to which the member stations are subject may be continually changing, the transmit power level used by each station is determined based upon the reported SNR and corresponding transmit power most recently stored within its database. Each time that a member station of network 12 initiates communication with the other members of the network as a server, it uses the transmit power level that was last required to effectively communicate with the member station having the lowest reported SNR for communications from the member station now initiating the transmission.

The adaptive power control method is initiated when the network is first formed, at which time, virtually no network communication link quality information is known. The first station to transmit a "form network" control block 72 does so at the default power level, $P_{default}$, which can be a relatively low power level if the prospective member stations are initially close together. However, if no potential member stations of the network respond to transmissions at this level within the prescribed time, the station first acting as the server increments its transmit power level by $P_D$ and reissues the form network control block. This action is repeated until a prospective member station responds with a Join Network control block, or until no prospective member has responded to transmissions at the maximum transmit power level, $P_{max}$.

After some, and possibly all, network communication link quality parameters are known to each member station of the network, a member station uses the following algorithm in determining its transmit power level, $P_{xmit}(dB)$, required for the "link to" another specific member station:

$$P_{xmit}(dB)=P_{[NMN]}(dB)-R_{rSNR}(dB)+P_{margin}(dB) \quad (1)$$

where P[NMN](dB) is the last transmit power level used by the client (in communicating with the server), identified by the network member number (NMN) (which is a short form identifying the member station ID), $R_{rSNR}(dB)$ is the SNR last reported by the member station identified by NMN for a transmission received from the server, and $P_{margin}(dB)$ is an optional power margin, used for example, to compensate for increased RFI in the vicinity of the member station identified by NMN, i.e., the client, which should guarantee reception. When parameters for certain of the links are totally unknown, the transmit power level is initially set to $P_{default}$, for purposes of signaling, and incrementally increased by $P_D$ until communication with all member stations is established (or until $P_{max}$ is reached, whichever occurs first), as already explained.

After the network is established, any server attempts initially to establish communications with member stations that have been identified as unresponsive or with the member station reporting the lowest SNR, if all member stations previously responded. The member station reporting the lowest SNR (or the one failing to respond to the last communication) determines the transmit power level used for the link (to that member station), according to the following equation:

$$P_{xmit}(dB)=P_{xmit[Y]}(dB)-R_{rSNR[Y]}(dB)+P_{margin}(dB) \qquad (2)$$

where $P_{xmit[Y]}(dB)$ is the transmit power level last reported by the member station having the lowest SNR (or one not reporting during the last communication exchange), and $R_{SNR[Y]}(dB)$ is the SNR reported by that member station for the transmission last received from the server.

Once signaling has established communications, the server acting as the controller polls each client by identifying which client is to respond, the transmit power that the server's transceiver will change to, the SNR of the polled clients, (or No Acknowledgment (NAK)—if a control block response is not received in response to the network message request).

Each polled client responds at the transmit power level that is thus calculated based upon the data contained within its database, i.e., using the transmit power level most likely to be received by all member stations of the network; however, the level of the transmit power used to respond by each member station that is polled is calculated as indicated in the following Table 2.

an SNR of 6 dB. Accordingly, the database stored in memory 60 at each member station includes the most recent information on the transmit "to" and "from" power levels:

$$P_{xmit[to\ NMN]}(dB)=P_{xmit}(dB)-R_{xSNR[NMN]}(dB)+P_{margin}(dB) \qquad (3)$$

Equation 3 identifies the transmit power level that should be used to communicate effectively with member station NMN and includes an adjustment for the SNR of transmissions received by member station NMN (from the server), $R_{xSNR[NMN]}$ and a predetermined margin, $P_{margin}$. The transmit power level that should be used by the client member station NMN to reach the server is:

$$P_{xmit[from\ NMN]}(dB)=P_{xmit[NMN]}(dB)-R_{rSNR[NMN]}+P_{margin} \qquad (4)$$

Also included in the database stored in memory 60 of each member station 10 is an indicator of the quality of each communication link, e.g., high, medium, or low, where the highest quality or confidence in the data is gained from responses by directly polled client member stations, while a lower confidence is attributed to client member stations that are polled by another member station acting as a server and based upon their response (or lack of response). The quality factor also declines with the passing of time since the data were last updated. The magnitude of the difference between the two values determined in Equations (3) and (4) is used to calculate $P_{jamming\ margin}$ as follows:

$$P_{jamming\ margin[NMN]}=P_{[to\ NMN]}-P_{[from\ NMN]} \qquad (5)$$

After the member station that has assumed the controller state as server successfully signals and receives a response from the principal client member station being signaled during the initial phase of a communication, it uses the adaptive power control algorithm to adjust its transmit

TABLE 2

| CONDITIONS | | $P_{xmit}$ and RECEIVED $R_{SNR}$ | $P_{xmit}$ CALCULATION |
|---|---|---|---|
| Initial polling or NMN and | | Control block not detected | N/A |
| | $P_{xmit}$ well | If $P_{xmit(signaling)}-R_{rSNR}+P_{margin}<=P_{xmit}$ | $P_{xmit}$ as previously calculated for lowest SNR member |
| below | $P_{max}$ | else | Increase $P_{xmit}$ to $P_{xmit(signaling)}-R_{rSNR(signaling)}+P_{margin}$ |
| NMN being repolled | | If first detection of polling and $P_{xmit(signaling)}-R_{rSNR(signaling)}+P_{margin} <= P_{xmit}$ | $P_{xmit}$ as previously calculated for member station having lowest SNR |
| and | $P_{xmit(signaling)}$ | If first detection of polling and $P_{xmit(signaling)}-R_{rSNR(signaling)}+P_{margin}>P_{xmit}$ | Increase $P_{xmit}$ to $P_{xmit(signaling)}-R_{rSNR}+R_{margin}$ |
| increased, but | | Else respond again if $P_{xmit}=P_{max}$ | No Change |
| | below $P_{max}$ | Else | $P_{xmit}=P_{xmit}+P_D$ |
| NMN being repolled at | $P_{max}$ | Control Block not detected Else | N/A $P_{xmit}=P_{max}$ |

Due to the presence of localized electromagnetic interference sources in the proximity of any of the member stations on the network, the SNR with which one member station's transmissions are received by another may be different than that with which the other member station's radio transmissions are received. For example, referring to FIG. 1, member station 10a may receive radio transmissions from member station 10d with an SNR of 9 dB, whereas, using the same transmit power level, member station 10d receives radio transmissions from member station 10a with power level for polling each other member station. The polling establishes the SNR for each link at the transmit power level used by the server when each client member station being polled responds. However, each member station independently determines the member station that has the lowest SNR (relative to itself) and adjusts its transmit power level accordingly when responding, to provide a predetermined margin to ensure effective communications with all member stations, including the one that has the lowest SNR relative to the client member station responding. The adaptive power algorithm is thus more generally defined by the following equation:

$$P_{xmit[Cn]}(dB) = P_{xmit[NMN\ Cn-1]}(dB) - R_{xSNR[NMN]}(dB) + P_{margin}(dB) \quad (6)$$

where $P_{xmit[Cn]}(dB)$ is the transmit power level used in the current transmission to ensure that member station NMN receives the communication, $P_{xmit[NMN\ Cn-1]}(dB)$ is the transmit power level last used to communicate with that member station, and $R_{xSNR[NMN]}(dB)$ is the SNR reported by member station NMN for the transmission it received at transmit power level $P_{xmit[NMN\ cn-1]}(dB)$.

By applying the algorithm defined by Equation (6), the transmit power level of each member station 10 in network 12 is adjusted relatively quickly so that all transmissions between member stations are at a minimum transmitter power sufficient to maintain viable communications. Furthermore, the adjustment and maintenance of the transmit power used by each member station is accomplished at maximum speed, automatically, without interference with the voice and data communications on network 12.

Description of Algorithm Implemented By the Control

Figure 7:
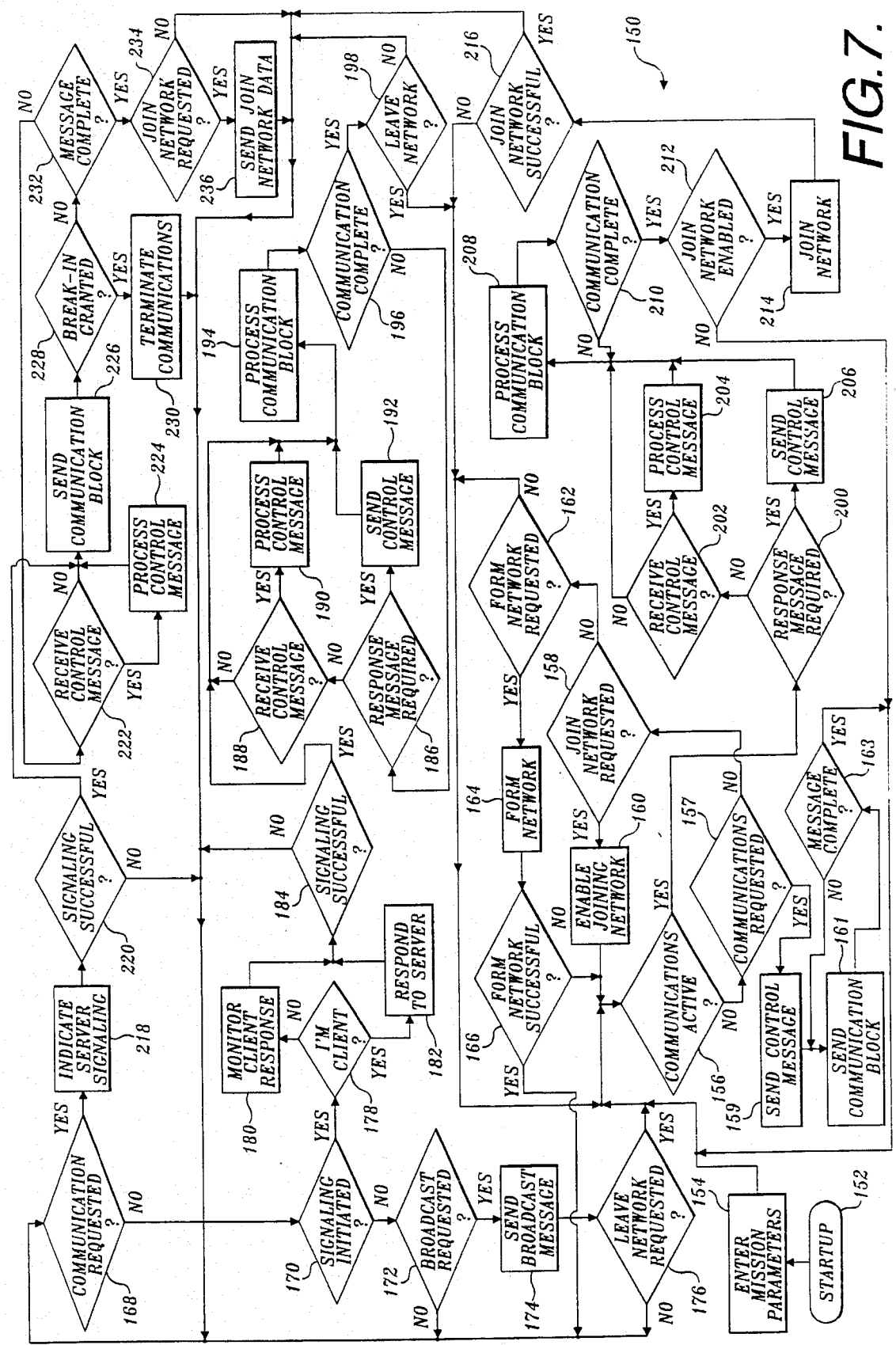
FIG. 7 is a flow chart illustrating the logical steps implemented by the control in each member station of the network.

Referring to FIG. 7, the logical steps carded out by control 34 in implementing interactions with the network by a station are illustrated in a flow chart 150. Flow chart 150 begins at a start block 152, which is followed by a block 154 in which the operator enters the mission parameters, including, for example, modification of the default power level, modification of the maximum power level, and modification of the incremental changes in power level that will be used on a mission. A decision block 156 follows in which control 34 determines if communications between member stations on the network are active and if not, proceeds with a decision block 157. In decision block 157, control 34 determines if communications are requested by the station prior to its becoming a network member station, and if not, proceeds to a decision block 158. A positive response to decision block 157 leads to a block 159, which provides for transmitting a communications control block. Thereafter, a block 161 provides for transmitting communications blocks during successive frames 70 until a decision block 163 determines that the message is complete. Since this communication is made by the station while not part of the network, no attempt is made to establish a communication link by signaling. The logic then proceeds to decision block 156.

Decision block 158 determines if a "Join Network request" has been made by the operator, and if so, proceeds to a block 160 wherein control 34 enables joining the network. If the join network request has not been made, a decision block 162 determines whether a request has been made by the operator to form the network, which would normally precede any given member station joining. A negative result causes control 34 to loop back to decision block 156. Otherwise, the logic proceeds to a block 166 to form the network. If network 12 is successfully formed, i.e., if communications are established with a member station in decision block 166, the logic proceeds to a decision block 168. Otherwise, the logic returns to decision block 156.

In decision block 168, control 34 determines if the operator has requested a communication by appropriating toggling communication switch 45. If not, the control determines if signaling has been initiated by another member station, for example, as a result of another transceiver signaling a member station having the last reported lowest SNR, or signaling a member station that had failed to respond to a previous communication. If the answer to decision block 170 is negative, a decision block 172 determines if control 34 has initiated broadcast of a message and if so, in a block 174 broadcasts the message. A notice that a member station is leaving the network is an example of such a broadcast message, occurring when the operator changes to a different channel. By broadcasting this type of message, other member stations are informed, so that they do not attempt to communicate with the departed station as successively higher transmit power levels. If decision block 172 has a negative result, the control logic returns to decision block 168. After broadcasting the message in block 174, a decision block 176 determines if control 34 is leaving the network, and if so, proceeds to decision block 156. Otherwise, the control logic again proceeds to decision block 168.

If the result of decision block 170 is affirmative, indicating that signaling of a member station has been initiated by a server, a decision block 178 determines if this member station is the one being signaled as the principal client. If not, a block 180 provides for monitoring a response by the principal client being signaled by the server so that the transmit power level and SNR with which the principal client's transmissions were received by the client are stored in the database, to establish the link from the principal client. Block 180 thus encompasses the storing and updating of data concerning transmit power level and communication quality from the principal client. After block 180, control 34 proceeds to a decision block 184.

A positive response to decision block 178 indicating that the member station is the principal client as determined by a server causes its control 34 to proceed to a block 182 wherein it transmits a response to the server. From block 182, the logic proceeds to decision block 184. Decision block 184 determines if the signaling by the server to the principal client was successful. This decision block may involve repetitive transmissions by the server to the client at incrementally increasing power levels, up to the maximum power level, or until a response by the client is successfully received by the server. In the event that the response was not received after the transmit power level of the server had reached the maximum, $P_{max}$, the server will signal a different member station as the principal client, and a negative response to decision block 184 results. Consequently, the control logic proceeds back to decision block 168. Otherwise, if signaling is successful, the logic proceeds to a block 194.

In decision block 186, control 34 determines if a response message is required to the communication received from the server in block 194, i.e., whether it is polled by a server. If not, a decision block 188 determines if a transmission from a client is a control message and if so, a block 190 provides for processing the control message to determine an appropriate action. Otherwise, or after processing the control message, the logic proceeds to block 194.

If a response message is required as determined in decision block 186, control 34 sends a response control message in a block 192. The response control block is transmitted at the power level calculated in accordance with equation (6) and contains the $P_{xmit}$ it used to transmit the control block and $R_{rSNR}$ with which the communication block was received, thereby establishing the "link to" from the server. If the response control block is received by the server, the server returns the $R_{rSNR}$ in the network message to establish the "link to" for the client. If the server does not receive a polled response control block from the appropriate member station, the server returns a NAK in the network message.

Thereafter, a block 194 provides for processing a communication block received from the server and the processing of the network message within the communication block. Similarly, subsequent communication blocks are processed until in a decision block 196, control 34 determines by processing the network message that communication is complete. If not, the logic flow returns repeatedly to decision block 186 until all communication blocks are received and the communications are completed. Thereafter, a decision block 198 determines if the operator wishes to leave the network.

Assuming that a negative response to decision block 198 occurs, the logic returns to decision block 168. Otherwise, if the operator decides to leave the network, a control block is broadcast to all members that the member station is leaving the network, and the logic returns to decision block 156, enabling control 34 to monitor communications until such time that the operator decides to rejoin the network.

If communications are active on the network in decision block 156, a decision block 200 (like decision block 186) determines if a response message is required. Assuming that a response is required, a block 206 provides for transmitting the response message, enables the Join Network control block, and then the logic proceeds to a block 208. Otherwise, if a response is not required, a decision block 202 determines if a control message has been received, and if not, also proceeds to block 208. If a control message was received, a block 204 provides for processing the control message to determine the appropriate action. This process is repeated based upon a decision block 210, until the communication is completed, so that the full message can be processed and any required response provided. Thereafter, a decision block 212 checks to see if join network (flag) is enabled, and if so, a block 214 provides for sending a control message to the active server and other members of the network indicating the station's intent to join the network, providing the server with its ID, $P_{xmit}$ and $P_{rSNR}$ with which the station received the server's transmission. In turn, the server informs the station of its NMN, the NMNs and ID numbers of all member stations on the network, and the $R_{rSNR}$ with which the server received the station's last transmission. A negative response to decision block 212 leads to decision block 156. If the join network procedure is successful in a decision block 216, the logic proceeds to decision block 168; otherwise, it returns to decision block 156.

Referring to decision block 168, if a communication has been requested by the operator using communication switch 45, a block 218 initiates signaling, by targeting as the principal client the hardest to reach member station; the member station signaling is now acting as a server. Equation 6 determines the transmit power level used by the server. If signaling is successful as determined by the server receiving a response control block from the principal client, from a decision block 220, the logic proceeds to a decision block 222 to determine if a control message has been received from the client member station polled. Otherwise, if the initial signaling is unsuccessful, and assuming that communication is still being requested by the operator, the signaling by the server is repeated at an incrementally higher power level and is again directed to the principal client member station as previously determined. If the principal client does not respond at $P_{max}$, then the NMN is determined to be inactive and signaling is repeated at a transmit power level as calculated previously, with the NMNs remaining in the data base. If no link is established and the list of NMNs is exhausted, the logic proceeds to block 168.

Following the signaling transmission, decision block 222 determines if the control message was received, and if so, processes the control message. Otherwise, or after processing the control message, the server sends a communication block as indicated in a block 226, with a network message. Thereafter, a decision block 228 determines if a break-in request by another station was made, based upon the processed control message in block 224, and if not, proceeds with a decision block 232 to determine if the message being transmitted is completed. If the message is not completed, the logic loops back to decision block 222 and repeats the loop until all frames of the message have been transmitted. If a break-in request control block is received from another member station, decision block 228 proceeds to a block 230 in which the server terminates its communications and informs member stations of the network message, yielding the roll of server to the member station requesting break-in. The logic then returns to decision block 168 to await the next request by the operator for transmission or action by the member station to which control was yielded during break-in to begin signaling.

After a message is completed without any break-in, the logic proceeds from decision block 232 to a decision block 234, which determines if a member station had transmitted a request to join the network. If so, the server responds by sending the necessary join network data in a block 236, including data concerning transmit power level, NMNs and ID numbers of members, and quality of each of the communication links thus established. If no join network had previously been received, the logic returns to decision block 168 to await further input from the operator using communication switch 45 indicating a desire to transmit a message, or signaling by a member station.

Figure 8:
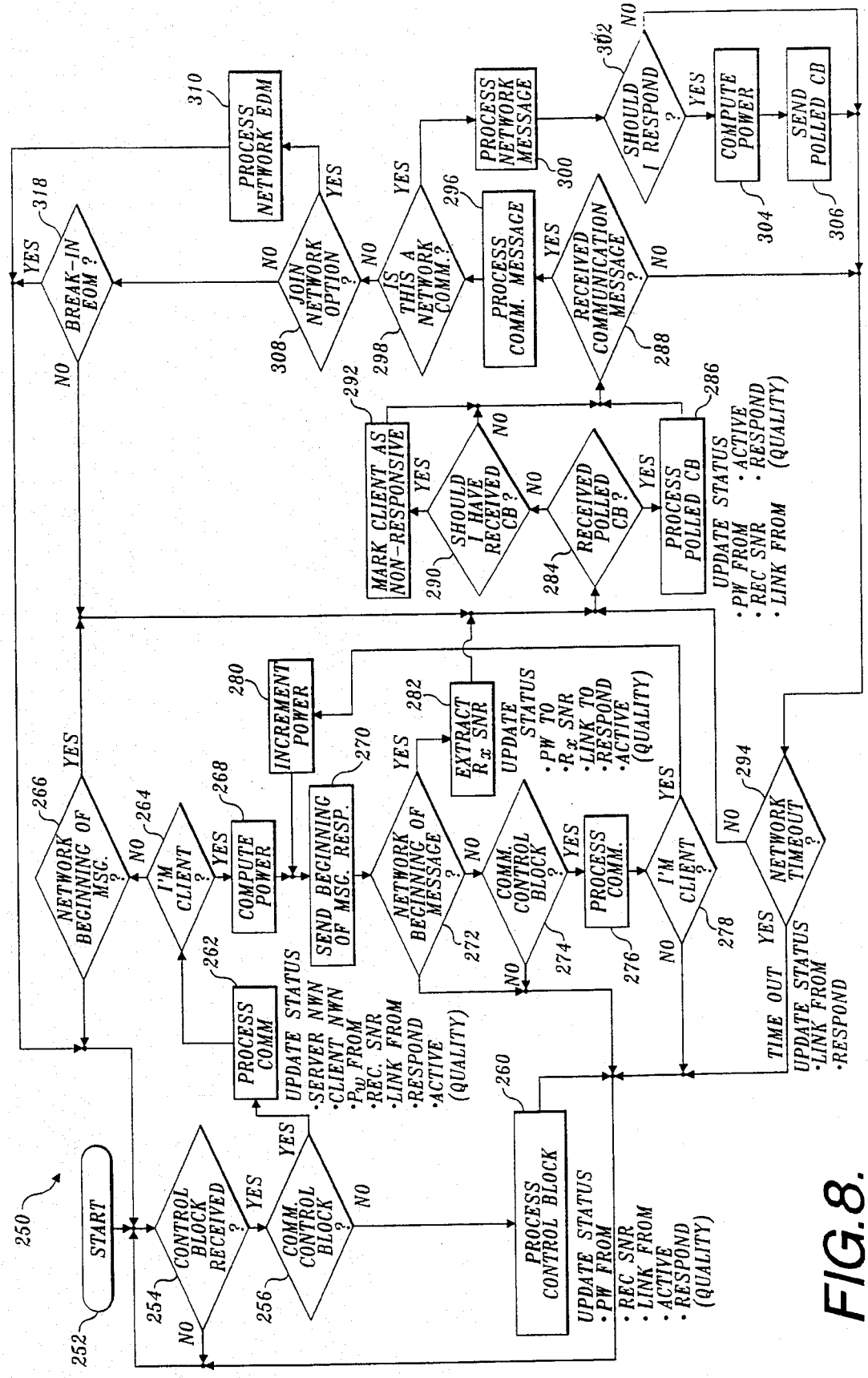
FIG. 8 is a flow chart illustrating the logic used by a member station acting as a client, i.e., other than as a controlling member station, including the steps for setting its transmit power level.

Flow chart 150 provides an overview of the overall network operation, but does not provide details indicating how the adaptive power aspect of the control is used to provide an optimum transmit power level. Details concerning the decisions that enter into the transmit power used by a client member station of network 12 are shown in FIG. 8, generally in a flow chart 250. Flow chart 250 begins at a start block 252 corresponding to decision block 170 in flow chart 150 of FIG. 7. A decision block 254 determines whether a control block has been received, and if not, loops back until an affirmative response is obtained. A decision block 256 then determines whether the control block is a communication control block and if not, proceeds to a block 260, where the message is processed. Assuming that the control block indicates a beginning of message received, a block 260 processes the control block. The processing updates the transmit power level used by the client in response to the signaling, the received SNR, the identity of the member station transmitting, and other information retained in its database by each control 34. Also updated is a determination of whether a response is received and an indication of the quality of the information (an arbitrary number from zero to ten that is assigned to the data for a link, which degrades over time since the data were last updated).

Following block 260, the logic loops back to decision block 254 to await the reception of the communication block, which branches to a block 262. In block 262, the communication block is processed to identify the server network number, the principal client network number, the transmit power used by the server transmitting, the SNR with which the control block was received, identification of the link, and the quality of data indication for the link. Thereafter, a decision block 264 determines whether this member station (processing the transmission) is the principal client to which this control block was directed, and if not, proceeds with a decision block 266 to determine if a transmission is the beginning of a communication message. If not, the logic returns to decision block 254.

Assuming an affirmative response to decision block 264 indicating that the member station receiving the transmission is the principal client intended, a block 268 computes the transmit power that should be used in responding. The transmit power used is that required to reach the member station reporting the lowest signal-to-noise ratio with regard to transmissions from this member station (the client), or the maximum transmit power if the server is using maximum transmit power. Then, the member station transmits a beginning of message response in a block 270. A decision block 272 determines whether the server's response corresponds to the beginning of a message in the network message and if not, continues with a decision block 274, which determines whether the transmission is a repoll of the communication control block. If not, it proceeds back to decision block 254; alternatively, the logic proceeds with a block 276 wherein control 34 processes the repolled communication block. Block 276 thus corresponds to block 262 in terms of the information or data that are updated by processing the communication block. Following block 276, a decision block 278 again determines whether the member station is the intended principal client, and if not, proceeds back to decision block 254. If the member station is the principal client, then the server has failed to receive its response, causing the principal client to increment its transmit power by $P_D$ in a block 280 and limiting its transmit power to $P_{max}$, unless the server is at $P_{max}$, in which case the principal client responds at $P_{max}$.

If the response to decision block 272 is affirmative, indicating that it is the beginning of a communication, which includes a network message, the principal client extracts the received SNR reported by the server with respect to its receipt of the client's response control block transmission in a block 282, using that data to update its database. Thereafter, it proceeds to a decision block 284. Decision block 284 is also reached if the determination in decision block 266 is positive, i.e., that the beginning of a network message has been received. In decision block 284, the member station determines whether it has received a polled communication block, i.e., has the server established initial communications and is now polling other member stations in the network. If so, a block 286 processes the polled communication block, updating the database with the same data as provided in block 260. After processing the polled communication block, the logic proceeds to a decision block 288.

If the response to decision block 284 is negative, a decision block 290 determines if the member station should have received a control block (from another member station responding as a client to a request to respond from the server) and if not, proceeds to decision block 288. Alternatively, if the response to decision block 290 is affirmative, the logic proceeds to a block 292 which marks the client that failed to respond to the server as nonresponsive. Thereafter, the logic again returns to decision block 288.

In decision block 288, the logic determines if the member station has received a communication message. If not, it proceeds to a decision block 294, in which control 34 determines if the network has timed out, i.e., whether a predefined time interval has elapsed without any communication from the server. If so, the logic proceeds back to decision block 254, and if not, loops back to decision block 284 to process the next frame.

An affirmative response to decision block 288 causes control 34 to process the communication message in a block 296 and extract the network message, so that it can update its database with the same data as provided in block 260. Processing of the network message enables the member station to extract the actual content of the message either as digitized voice, or as digital data transmitted by the server and route it to its intended destination. A decision block 298 then determines if this network message is a network communication, and if so, processes the network message in a block 300. A decision block 302 determines from the server's network message whether the member station should respond and if not, the logic proceeds to decision block 294. Alternatively, if a response is appropriate, a block 304 enables the member station to compute the transmit power at which a response should be transmitted based on Equation 4 and then in a block 306, the member station transmits the transmit power that it is using and the received SNR of the transmission that it last received from the server. Thereafter, the logic again proceeds to decision block 294.

Referring back to decision block 298, if the network message received is not a network communication, the logic proceeds to a decision block 308, which determines whether there is an option to join the network, e.g., at termination of communications. An affirmative response to decision block 308 leads to a block 310 wherein the network end of message is processed, thus denoting that the message in progress has been completed so that a station can join network 12. Following block 310, the logic proceeds back to decision block 254. If the response to decision block 308 is negative, a decision block 318 determines if the current frame is an end of message. If not, the op code for the frame is apparently unrecognized, leading the logic back to decision block 284. However, if the network message is an end of message, the logic proceeds to decision block 254 to coincide with the server terminating communications.

Figure 9:
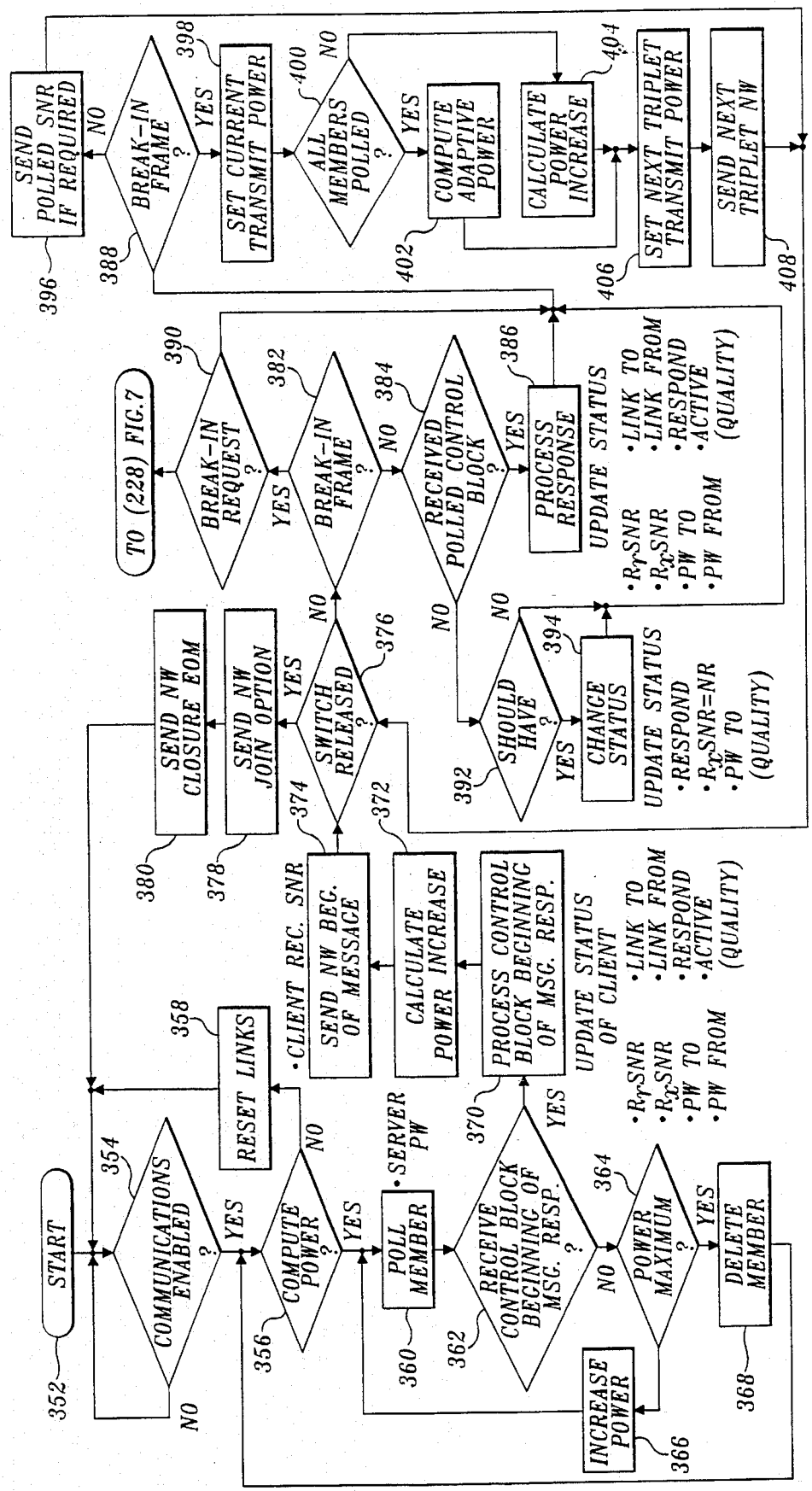
FIG. 9 is a flow chart illustrating the steps executed by a member station acting as a server, i.e., as the controlling member station, including the steps required to adaptively control its transmit power level.

Details of the adaptive power control scheme as implemented from the point of view of the server are shown in a flow chart 350, in FIG. 9. Flow chart 350 starts a point corresponding to block 218 in FIG. 7; wherein the server initiates signaling. Following a start block 352 (in FIG. 9), a decision block 354 determines whether the communications have been activated, for example, by the operator. If so, a decision block 356 computes the transmit power and identifies the principal client. If no active member stations are found in the database, it is not necessary to compute the transmit power and the control logic proceeds to a block 358, which resets the link data in its database for future signaling. Thereafter, it proceeds back to decision block 354. However, if active member stations are found, from decision block 356, the control logic proceeds to a block 360 wherein the server polls a specific member station client selected as having the lowest reported SNR or as having failed to respond to the last communication. The transmit power level initially used by the server is determined with Equation 6. A decision block 362 then determines if the server received a control block including a beginning of message response in the next frame, indicating that the principal client member station being polled has responded. If not, a decision block 364 determines if the transmit power level is at the maximum $P_{max}$ and if not, a block 366 increases the transmit power by the incremental value $P_D$ that is predefined for the mission and limits the transmit power level to $P_{max}$. Following block 366, the same principal client member station is again polled. This loop repeats until the result in decision block 364 indicates that power is at a maximum or the result in block 362 indicates that the polled member station has responded. If the member station does not respond to transmissions at maximum transmit power level, a block 368 deletes that member station from the database as an active member.

However, if a response is received from the member station, the logic proceeds from decision block 362 to a block 370 wherein the control block beginning of message response is processed, enabling the server (and other member stations of the network) to update their database with the received SNR (both with regard to the server and to the client member station that was polled) and the transmit power level used by both the server and the client member station polled. The quality of this link data is also reflected in the database.

A block 372 calculates any power increase that is required based upon the SNR reported by the client. For example, if the SNR is below a predefined minimum and the server is not yet at its maximum transmit power level, it increases its transmit power level by the amount required to maintain the predetermined power margin. In a block 374, the server sends the network message indicating the beginning of message and includes in that frame the SNR with which it received the response from the principal client last polled.

A decision block 376 checks to see if the communication switch has been released and if so, transmits a network message 378 indicating that a station has the option of joining the network. Having concluded the message, a block 380 instructs control 34 to send the network closure, end of message in the network message, and thereafter, the logic proceeds to decision block 354. If the communication switch has not been released in decision block 376, the logic determines if the current frame is a break-in frame 382 (every third frame of a communication) and if not, proceeds to a decision block 384, which determines whether the server has received a polled communication block from the last client member station polled. If so, it processes the polled communication block in a block 386, enabling the server to update its database to reflect the receive and transmit SNR and the transmit power level that it used to contact the polled client member station and that the client member station used to respond to the server. Having thus concluded the processing of any received control block, the logic then proceeds to a decision block 388, where the network message contents are derived.

A negative response to decision block 384 leads to a decision block 392 which determines whether the server should have received a polled communication block from the last member station polled and if so, a block 394 changes the status of that member station in the server's database, indicating its failure to respond. Thereafter, the logic proceeds to decision block 388. Similarly, a negative response to decision block 392 leads to decision block 388.

In decision block 388, the logic determines whether the current frame is a break-in frame, and if not, a block 396 sends the polled SNR in the network message to the client (if required). Thereafter, the logic proceeds to decision block 376. If the inquiry made in decision block 388 is answered affirmatively, a block 398 sets the current transmit power level to that which will be used for subsequent frames of the communication based on Equation 6 and a decision block 400 determines if all member stations have been polled. If so, a block 402 computes the adaptive power that will be used for transmissions in the next frame. Alternatively, if all member stations have not been polled, a block 404 calculates any power increase that is required based upon the last reported SNR at the current transmit power level of the clients polled. (Note that transmit power level can not be decreased until all clients are polled.) A polled response indicating that the SNR for transmissions received from the server by the client last reporting the lowest SNR is greater than a predefined maximum. Subsequently, a block 406 sets the transmit power level for the next three frames, which are transmitted in a block 408. Once again, the logic returns to decision block 376. The loop from decision block 376 through either blocks 396 or 408 continues until the operator releases the communication switch. In that context, decision blocks 354 and 376 also represent a condition wherein control 34 initiates the transmission of data in a manner equivalent to an operator pressing communication switch 45. Successive frames of the message are thus transmitted until the end of message is reached, or until a break-in request is received from another member station having a priority message. Since each frame is only one tenth of a second long in the preferred embodiment, the polling of client member stations that occurs and the automatic adaptive control of the transmit power level does not interfere with communications on the network, either with regard to the server or the client.

While the preferred embodiment of the invention has been illustrated and described, it will be appreciated that various changes can be made therein without departing from the spirit and scope of the invention. Accordingly, it is not intended that the scope of the invention in any way be limited by the disclosure, but instead, that it be determined entirely by reference to the claims that follow.

The embodiments of the invention in which an exclusive property or privilege is claimed are defined as follows:

1. An adaptive power level radio network, comprising:
   a plurality of member stations, one of said plurality of member stations becoming a controller station by initiating a communication with the other member stations on the network, said plurality of member stations each including:
   (a) a transmitter having a selectively variable transmit power level, the transmitter of the controller station transmitting a radio signal at a predefined power level;
   (b) a receiver; and
   (c) control means, connected to the receiver and to the transmitter, for:
   (i) controlling the transmit power level of the transmitter;
   (ii) designating one of said plurality of member stations as a selected station by determining which of said plurality of member stations had the poorest reception based on prior communications between said one of said plurality of member stations and the other member stations of the network; and
   (iii) adjusting the transmit power level of the controller station, in response to respondent signal received by the controller station from the transmitter of said selected station, said respondent signal indicating whether said selected, member station has received a transmission from the controller station that was transmitted at the predefined transmit power level, the control means of the controller station responding to a failure to receive the respondent signal from said selected station, by incrementally increasing the transmit power level of the transmitter in the controller station, to establish communications with stud selected station.

2. The adaptive power level radio network of claim 1, wherein said plurality of member stations each further comprises means for determining a reception quality for the reception of the radio signals by the receiver, said control means reporting the reception quality of the radio signal initially received from the controller station in the respondent signal.

3. The adaptive power level radio network of claim 2, wherein the control means reduce the transmit power level of the transmitter in the controller station, if the reception quality indicated by the respondent signal exceeds a predefined value.

4. The adaptive power level radio network of claim 2, wherein the control means comprise a processing unit; and associated memory means for storing instructions that determine how the processing unit controls the transmit power level of the transmitter in the controller station, in response to the respondent signal.

5. The adaptive power level radio network of claim 4, wherein the memory means also store data that include the reception quality and transmit power levels used by said plurality of member stations in the network, said data being compiled from the respondent signals from at least three other member stations of said plurality of member stations, the control means using the data to designate said selected station and adjust the predefined transmit power level for the transmitter of said controller station.

6. The adaptive power level radio network of claim 2, wherein said plurality of member stations identify themselves in the respondent signal with an identification code, the control means of said plurality of member stations encoding the identification code, the reception quality, and a transmit power level in the respondent signal.

7. The adaptive power level radio network of claim 1, wherein if the control means of one of the plurality of member stations transmits a break-in signal to interrupt communication between other of the plurality of member stations in the network, the control means of the controller station terminate any transmission then in progress, and said member station transmitting the break-in signal becomes the controller station.

8. The adaptive power level radio network of claim 1, wherein the control means designates another one of said plurality of member stations as a selected station when the transmit power level of the transmitter in the controller station has reached a maximum and said respondent signal has not been revived.

9. The adaptive power level radio network of claim 1, wherein the control means designates said selected station as inactive from the network when the transmit power level of the transmitter in the controller station has reached a maximum and said respondent signal has not been received.

10. The adaptive power level radio network of claim 1, wherein signals transmitted from one of said plurality of member stations of the network to another comprise frames of a predefined duration, and wherein the control means determine the contents of each frame, said frames each comprising a control portion that conveys control signals and a communication portion that conveys communication signals.

11. An adaptive power level radio network, comprising:
 a plurality of member stations, one of said plurality of member stations becoming a controller station by initiating a communication with another member station on the network, said plurality of member stations each including:
  (a) a transmitter having a selectively variable transmit power level, the transmitter of the controller station transmitting a radio signal at a predefined power level;
  (b) a receiver;
  (c) control means, connected to the receiver and to the transmitter, for controlling the tramsmit power level of the transmitter and adjusting the transmit power level of the controller station in response to a respondent signal received by the controller station from the transmitter of said another member station with which the controller station is communicating, said respondent signal indicating whether said another member station has received a transmission from the controller station that was transmitted at the predefined transmit power level, the control means of the controller station responding to a failure to receive the respondent signal from said another member station, by incrementally increasing the transmit power level of the transmitter in the controller station, to establish communications with said another member station, the control means including:
   (i) a processing unit; and
   (ii) associated memory means for storing:
    (1) instructions that determine how the processing unit controls the transmit power level of the transmitter in the controller station, in response to the respondent signal;
    (2) data and that include reception quality and the transmit power levels used by said plurality of transmitters of other member stations in the network, said data being compiled from the respondent signals from each of the other member stations, the control means using the data to determine the predefined transmit power level for the transmitter of said controller station as a function of the poorest reception quality for all of the member stations stored in the data, for insuring communication between said controller station and the member station that reported the poorest reception quality in its respondent signal; and
  (d) means for determining the reception quality for the reception of the radio signals by the receiver, said control means reporting the reception quality of the radio signal initially received from the controller station in the respondent signal;
 wherein the control means operates in a plurality of modes in controlling the transmitter with which it is connected, including:
  (i) a passive monitor mode, entered when the network is being initialized, before a station becomes one of the plurality of member stations of the network and before the data are stored in the memory means;
  (ii) an active mode, wherein the station is one of the plurality of member stations of the network, its control means have identified other member stations of the network, and at least some of the data have been stored in the memory means; and
  (iii) a controlling mode, wherein the station is serving as said controller station and is in communication with at least one of the plurality of member stations of the network, and data for all other of the plurality of member stations are stored in the memory means of the controller station.

12. The adaptive power level radio network of claim 11, wherein the means for determining the quality of reception comprise a signal-to-noise power ratio monitor.

13. An adaptive power level radio network, comprising:

a plurality of member stations, each of which include:

transceiver means, including a transmitter portion and a receiver portion, for selectively transmitting and receiving radio signals, respectively, the transceiver means having a selectively variable transmit power level;

data storage means, for storing data indicating a relative quality of a communication link between said member station and at least one other member station of the network; and control means, connected to the transceiver means and the data storage means, for controlling the transceiver means, causing the transmit power level of the transceiver means to increase by a predefined increment if a respondent signal is not received from a designated member station in the network in response to a transmission of a radio signal from said transceiver means, wherein based upon the relative quality of each communication link, as indicated by the data within the data storage means, the control means:

(a) determine a minimum transmit power level at which the transceiver means transmits to achieve a communication link with the designated member station; and (b) determine the designated member station as the station having the poorest quality communication link relative to said member station.

14. The adaptive power level radio network of claim 13, wherein said plurality of member stations each further includes means for determining a signal-to-noise ratio of the radio signals received from others of said plurality of member stations; and wherein the data stored in the data storage means include the signal-to-noise ratio reported by at least some of the other member stations, the control means selecting as the designated member station one of the plurality of member stations intended to receive a communication, where said one of the plurality of member stations that has a lowest signal-to-noise ratio of all of the plurality of member stations for which data are stored in the data storage means.

15. The adaptive power level radio network of claim 13, wherein the control means cause the transceiver means of a member station initiating a communication to poll other member stations of the network by including a specific request for a response indicating the relative quality of the received radio signal.

16. The adaptive power level radio network of claim 13, wherein the transceiver means transmits a plurality of frames during each transmission, a frame that is initially transmitted including at least a synchronization signal and a control block portion containing control signals that are used by the control means of any of the plurality of member stations receiving the transmission.

17. The adaptive power level radio network of claim 16, wherein the control block portion comprises a plurality of operational codes that define different operating conditions of the network to which the control means of the plurality of member stations receiving a transmission including said plurality of operational codes respond during:

(a) initiation of the network; and (b) when one of the plurality of member stations is establishing communications with others of the plurality of member stations of the network.

18. The adaptive power level radio network of claim 17, wherein one of the plurality of member stations is a controller station which controls the network, the control means of the controller station respond to a break-in operational code received from one of the plurality of member stations, by yielding control of the network to said member station from which the break-in operational code is received.

19. A method for adaptively controlling a transmit power level of a radio signal transmitted by a transmitter in a member station of a network including a plurality of member stations, comprising the steps of:

(a) accumulating and storing data, said data defining quality of prior communication between said member station and other member stations in the network;

(b) identifying a specific member station included in the network as having the poorest quality communication link, based on said stored data;

(c) transmitting a polling radio signal at a predefined transmit power level, the polling radio signal serving to request a respondent signal from said specific member station;

(d) continuing to transmit a message at the predefined transmit power level, if said specific member station responds with the respondent signal, for indicating that the polling radio signal has been received and that an acceptable communication link has been established at a minimum transmit power level;

(e) increasing the transmit power level by a predefined increment, if the specific member station does not respond with the respondent signal; and (f) repeating step (e) for successive subsequent radio transmissions before again transmitting the message, until said specific member station responds with the respondent signal or until a predefined maximum transmit power level is achieved, whichever occurs first, for attempting to establish an effective communications link at the minimum transmit power level before transmitting the message.

20. The method of claim 19, further comprising the steps of:

determining a reception quality for radio transmissions received from other member stations of the network; and including the reception quality with which the radio signal polling the other member station is received in the respondent signal transmitted by the other station.

21. The method of claim 20, further comprising the step of decreasing the transmit power level, if the reception quality included in the respondent signal exceeds a predefined margin.

22. The method of claim 21, further comprising the step of incrementally reducing the transmit power level in subsequent radio transmissions until the reception quality reported by any other member station is less than or equal to the predefined margin.

23. The method of claim 19, wherein the polling radio signal comprises at least a synchronization portion and a control block portion, the synchronization portion being used to synchronize radio transmissions of other member stations, and the control block portion including a request for the respondent signal that is directed to said specific member station in the network.

24. The method of claim 23, wherein the polling radio signal and a subsequent radio signal transmitted by one of the plurality of member stations each comprise a plurality of frames.

25. The method of claim 23, wherein the control block comprise operational codes that define an operational status of the network and determine an operating mode for specific member stations from a plurality of operating modes of the network.

26. The method of claim 25, further comprising the steps of accumulating and storing data at each member station, said data defining a quality of the communication link between said member station and other member stations in the network.

27. A method for adaptively controlling a transmit power level of a radio signal transmitted by a transmitter in a member station of a network, comprising the steps of:

(a) transmitting a polling radio signal at a predefined transmit power level, the polling radio signal serving to request a respondent signal from at least one other member station included in the network, to establish a communication link, the polling radio signal including at least a synchronization portion and a control block portion, the synchronization portion being used to synchronize radio transmissions of other member stations, and the control block portion including a request for the respondent signal that is directed to a specific member station in the network and operational codes that define the status of the network and determine an operating mode for specific member stations;

(b) continuing to transmit a message at the predefined transmit power level, if the other member station responds with the respondent signal, for indicating that the polling radio signal has been received and that an acceptable communication link has been established at a minimum transmit power level;

(c) increasing the transmit power level by a predefined increment, if the other member station does not respond with the respondent signal;

(d) repeating step (c) for successive subsequent radio transmissions before transmitting the message, until the other member station responds with the respondent signal or until a predefined maximum transmit power level is achieved, whichever occurs first, for attempting to establish an effective communications link at the minimum transmit power level before transmitting the message; and (e) accumulating and storing data at each member station, said data defining a quality of the communication link between said member station and other member stations in the network;

wherein each member station operates in one of a plurality of modes, including:

(i) a passive mode entered before the network is initialized and before becoming a member station of the network;

(ii) an active monitor mode, wherein the member station is part of the network, has identified all other member stations in the network, is ready to respond to the polling radio signal from another member station, and has stored the data defining the quality of the communication link between itself and at least some of the other member stations in the network; and (iii) a controller mode, wherein the member station is part of the network, has identified all other member stations in the network, and is initiating or attempting to initiate communication with at least one other member station in the network, said member station initiating or attempting to initiate communication with said at least one other member station then comprising a controlling station.

28. The method of claim 27, further comprising the steps of identifying which of the plurality of member stations has the poorest quality communication link, based on the data stored, and initially transmitting the polling radio signal to said member station having the poorest quality communication link.

29. The method of claim 28, wherein the member station having the poorest quality communication link transmits a respondent signal that includes an indication of a transmit power level and the reception quality of the polling radio signal, which are stored as data by the plurality of member stations included in the network.

30. The method of claim 29, wherein the reception quality comprises a signal-to-noise ratio, and wherein the controlling station operating in the controller mode reduces its transmit power level to achieve a minimum acceptable signal-to-noise ratio for radio signals received by another member station.

31. An adaptive power level radio network, comprising:

a plurality of member stations, one of said plurality of member stations becoming a controller station by initiating a communication with another member station on the network, said plurality of member stations each including:

(a) a transmitter having a selectively variable transmit power level, the transmitter of the controller station transmitting a radio signal at a predefined power level;

(b) a receiver; and (c) control means, connected to the receiver and to the transmitter, for controlling the transmit power level of the transmitter and adjusting the transmit power level of the controller station in response to a respondent signal received by the controller station from the transmitter of said another member station with which the controller station is communicating, said respondent signal indicating whether said another member station has received a transmission from the controller station that was transmitted at the predefined transmit power level, the control means of the controller station responding to a failure to receive the respondent signal from said another member station, by incrementally increasing the transmit power level of the transmitter in the controller station, to establish communications with said another member station, said control means including memory for storing data and operating in a plurality of modes in controlling the transmitter with which it is connected, including:

(i) a passive monitor mode, entered when the network is being initialized, before a station becomes one of the plurality of member stations of the network;

(ii) an active mode, wherein the station is one of the plurality of member stations of the network, its control means have identified other member stations of the network, and the station has stored at least some data indicative of a reception quality for transmissions between itself and the other member stations of the network in the memory of its control means; and (iii) a controlling mode, wherein the member station is serving as said controller station and is in communication with at least one of the plurality of member stations of the network, and data indicative of the reception quality for transmissions between itself and the other member stations of the network are stored in the memory of the controller station.

32. The adaptive power level radio network of claim 31, wherein the control means comprise a signal-to-noise power ratio monitor for determining the quality of reception.

33. A method for adaptively controlling a transmit power level of a radio signal transmitted by a transmitter in a member station of a network, comprising the steps of:

(a) transmitting a polling radio signal at a predefined transmit power level, the polling radio signal serving to request a respondent signal from at least one other member station included in the network, to establish a communication link;

(b) continuing to transmit a message at the predefined transmit power level, if the other member station responds with the respondent signal, for indicating that an acceptable communication link has been established;

(c) increasing the transmit power level by a predefined increment, if the other member station does not respond with the respondent signal; and (d) repeating step (c) for successive subsequent radio transmissions before again transmitting the message, until the other member station responds with the respondent signal or until a predefined maximum transmit power level is achieved, whichever occurs first, for attempting to establish an effective communications link at a minimum transmit power level before transmitting the message, each member station of the network operating in one of a plurality of modes, including:

(i) a passive mode entered before the network is initialized and before becoming a member station of the network;

(ii) an active monitor mode, wherein the member station is part of the network, has identified all other member stations in the network, is ready to respond to the polling radio signal from another member station, and has stored data defining quality of the communication link between itself and at least some of the other member stations in the network; and (iii) a controller mode, wherein the member station is part of the network, has identified all other member stations in the network, and is initiating or attempting to initiate communication with at least one other member station in the network, said member station then comprising a controlling station.

34. The method of claim 33, further comprising the steps of identifying which of the plurality of member stations has the poorest quality communication link, based on the data stored, and initially transmitting the polling radio signal to said member station having the poorest quality communication link.

35. The method of claim 34, wherein the member station having the poorest quality communication link transmits a respondent signal that includes an indication of a transmit power level and the reception quality of the polling radio signal, which are stored as data by the plurality of member stations comprising the network.

36. The method of claim 35, wherein the reception quality comprises a signal-to-noise ratio, and wherein the controlling station operating in the controller mode reduces its transmit power level to achieve a minimum acceptable signal-to-noise ratio for radio signals received by another member station.

* * * * *

UNITED STATES PATENT AND TRADEMARK OFFICE
CERTIFICATE OF CORRECTION

PATENT NO. : 5,465,399  Page 1 of 2
DATED : November 7, 1995
INVENTOR(S) : J.C. Oberholtzer et al.

It is certified that error appears in the above-indentified patent and that said Letters Patent is hereby corrected as shown below:

COLUMN   LINE 8     17     "carded" should read --carried--

8     29     "SNK" should read --SNR--

11    4-46   "Table 1" should read

-- TABLE 1

| Comm. Request | Passive Monitor State | Active Monitor State | Controller State |
|---|---|---|---|
| Initiate Communications | If no active communications. - Initiate communications | No active commun. Switch to Cont. State Initiate communications | N/A |
|  | If active communications, wait until end of message received then initiate communications after predetermined delay. | If active communications, wait until end of message received; then initiate signal-ing & switch to Cont. State |  |
| Terminate Communications | Terminate communications. | N/A | Terminate message Send Join Network Request, then terminate commun. after servicing any Join Network request received. |
| Join Network | No known network Wait for network to become active and make Request to Join at first opportunity, if successful, switch to Active Monitor State | N/A | N/A |
|  | Known network If network is active, join, else, send Join Network Request & switch to Active Monitor State if successful | N/A | N/A |
| Form Network | Issue Form Network If successful, switch to Active Monitor State | N/A | N/A |
| Break-In | N/A | Send Break-In Request Only appropriate if a transceiver is in Controller State | N/A |

UNITED STATES PATENT AND TRADEMARK OFFICE
CERTIFICATE OF CORRECTION

PATENT NO. : 5,465,399  
DATED : November 7, 1995  
INVENTOR(S) : J.C. Oberholtzer et al.

Page 2 of 2

It is certified that error appears in the above-indentified patent and that said Letters Patent is hereby corrected as shown below:

| COLUMN | LINE | |
|---|---|---|
| 11 | 57 | "carded" should read --carried-- |
| 12 | 63 | "carded" should read --carried-- |
| 17 | 25 | "carded" should read --carried-- |
| 24 (Claim 1, | 65 line 27) | "selected," should read --selected-- |
| 24 (Claim 1, | 57 line 35) | "stud" should read --said-- |
| 25 (Claim 8 | 46 line 6) | "revived." should read --received.-- |
| 26 (Claim 11, | 5 line 13) | "tramsmit" should read --transmit-- |

Signed and Sealed this

Twentieth Day of August, 1996

Attest:

BRUCE LEHMAN

Attesting Officer     Commissioner of Patents and Trademarks